(12) United States Patent
Labadie et al.

(10) Patent No.: US 10,862,518 B1
(45) Date of Patent: Dec. 8, 2020

(54) RADIO FREQUENCY DECIBEL SCALED WIRELESS INTERFERENCE DETECTOR

(71) Applicant: Amazon Technologies, Inc., Seattle, WA (US)

(72) Inventors: Nathan Labadie, Gilroy, CA (US);
Kun Ting Tsai, Fremont, CA (US);
Cheol Su Kim, San Jose, CA (US);
Kwok Shing Lee, San Mateo, CA (US);
Haritha Tamvada, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/706,583

(22) Filed: Dec. 6, 2019

(51) Int. Cl.
*H04B 1/10* (2006.01)
*H04B 1/18* (2006.01)

(52) U.S. Cl.
CPC ............. *H04B 1/1027* (2013.01); *H04B 1/18* (2013.01)

(58) Field of Classification Search
None
See application file for complete search history.

(56) References Cited

U.S. PATENT DOCUMENTS

| 6,859,646 | B2* | 2/2005 | Khorram | H04B 17/318 455/234.1 |
| 10,218,450 | B1* | 2/2019 | Ramsubbaraj | H04B 15/00 |
| 10,581,155 | B1* | 3/2020 | Gradinaru | H04B 1/123 |
| 2007/0135042 | A1* | 6/2007 | Shiff | H04B 1/1027 455/13.3 |
| 2010/0324845 | A1* | 12/2010 | Spanier | G01R 22/10 702/62 |
| 2011/0254637 | A1* | 10/2011 | Manssen | H04B 1/109 333/2 |
| 2013/0309975 | A1* | 11/2013 | Kpodzo | H04B 1/1027 455/63.1 |
| 2014/0142765 | A1* | 5/2014 | Gammel | H04L 12/10 700/286 |
| 2014/0323071 | A1* | 10/2014 | Liao | H04B 1/1036 455/183.1 |
| 2015/0044980 | A1* | 2/2015 | Eddowes | H04B 17/21 455/226.2 |
| 2015/0078050 | A1* | 3/2015 | Colbeck | H02M 1/4225 363/126 |
| 2015/0163747 | A1* | 6/2015 | Chen | H04B 1/525 455/78 |
| 2015/0288396 | A1* | 10/2015 | Yun | H04W 24/10 455/305 |
| 2015/0295500 | A1* | 10/2015 | Mao | H05B 45/37 363/21.13 |

(Continued)

*Primary Examiner* — Lana N Le
(74) *Attorney, Agent, or Firm* — Lowenstein Sandler LLP

(57) ABSTRACT

Technologies directed to a wireless device with a Radio Frequency (RF) Decibel-Scaled Wireless Interference Detector that provides accurate energy readings of a channel through decibel-scaled output voltage are described. One method of the wireless device includes receiving a first RF signal via an antenna and converting the first RF signal to a multiple samples using a sampling rate, each sample including a digital value of a decibel-scaled output voltage. The method converts each of the samples to an energy value using a voltage-to-energy lookup table and determines a congestion level of a channel using the energy values.

20 Claims, 13 Drawing Sheets

(56) References Cited

U.S. PATENT DOCUMENTS

| | | | |
|---|---|---|---|
| 2015/0327099 A1* | 11/2015 | Ngai | H04B 1/406 |
| | | | 370/252 |
| 2018/0081354 A1* | 3/2018 | Magy | G05D 1/0022 |
| 2019/0072590 A1* | 3/2019 | Kim | G01R 21/133 |
| 2019/0082382 A1* | 3/2019 | Homchaudhuri | H04L 43/12 |
| 2020/0214002 A1* | 7/2020 | Lee | H04W 4/40 |

* cited by examiner

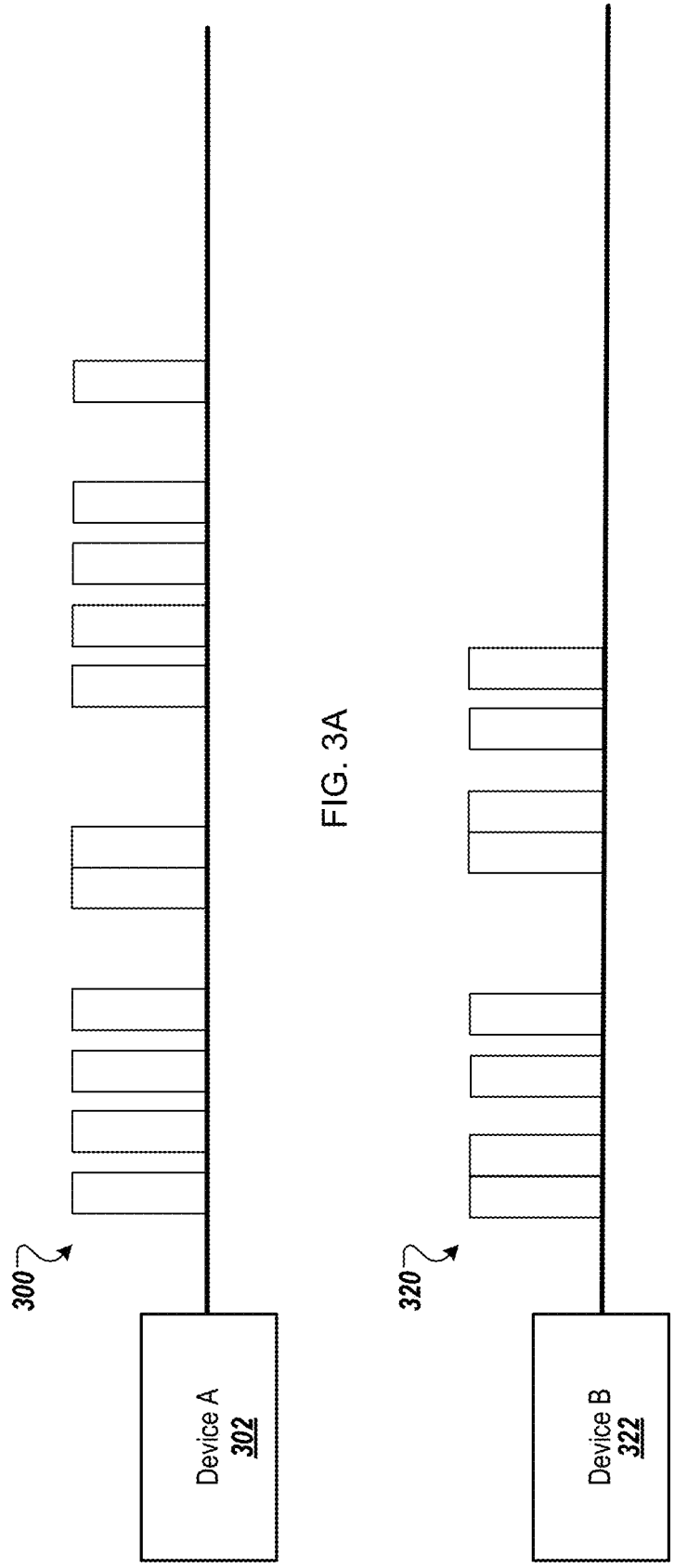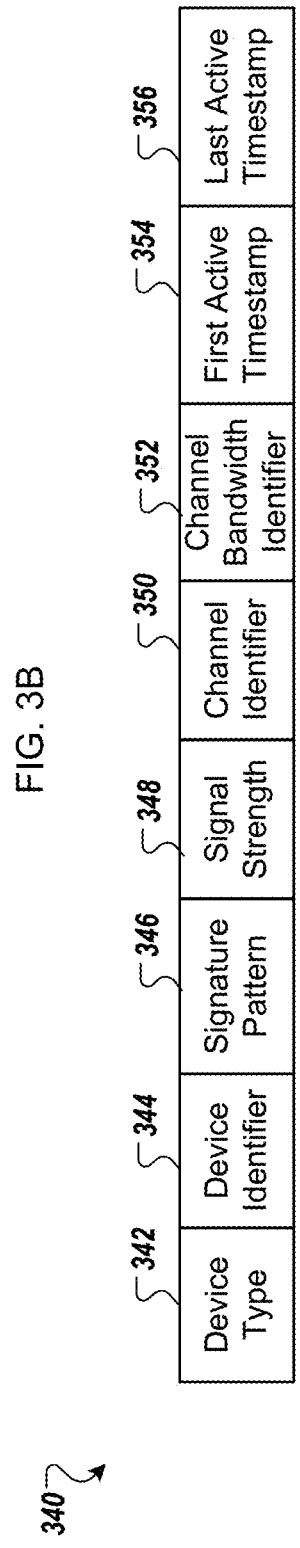

RADIO FREQUENCY DECIBEL SCALED WIRELESS INTERFERENCE DETECTOR

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, Personal Digital Assistants (PDAs), portable media players, tablet computers, netbooks, laptops, and the like. These electronic devices wirelessly communicate with a communications infrastructure to enable the consumption of the digital media items. In order to communicate with other devices wirelessly, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

FIG. 3A illustrates a first device signature with a first series of pulses that identifies a first wireless device according to one embodiment.

FIG. 3B illustrates a second device signature with a second series of pulses that identifies a second wireless device according to one embodiment.

FIG. 3C illustrates a number of column types for each row in a signature database according to one embodiment.

DETAILED DESCRIPTION

Figure 1:
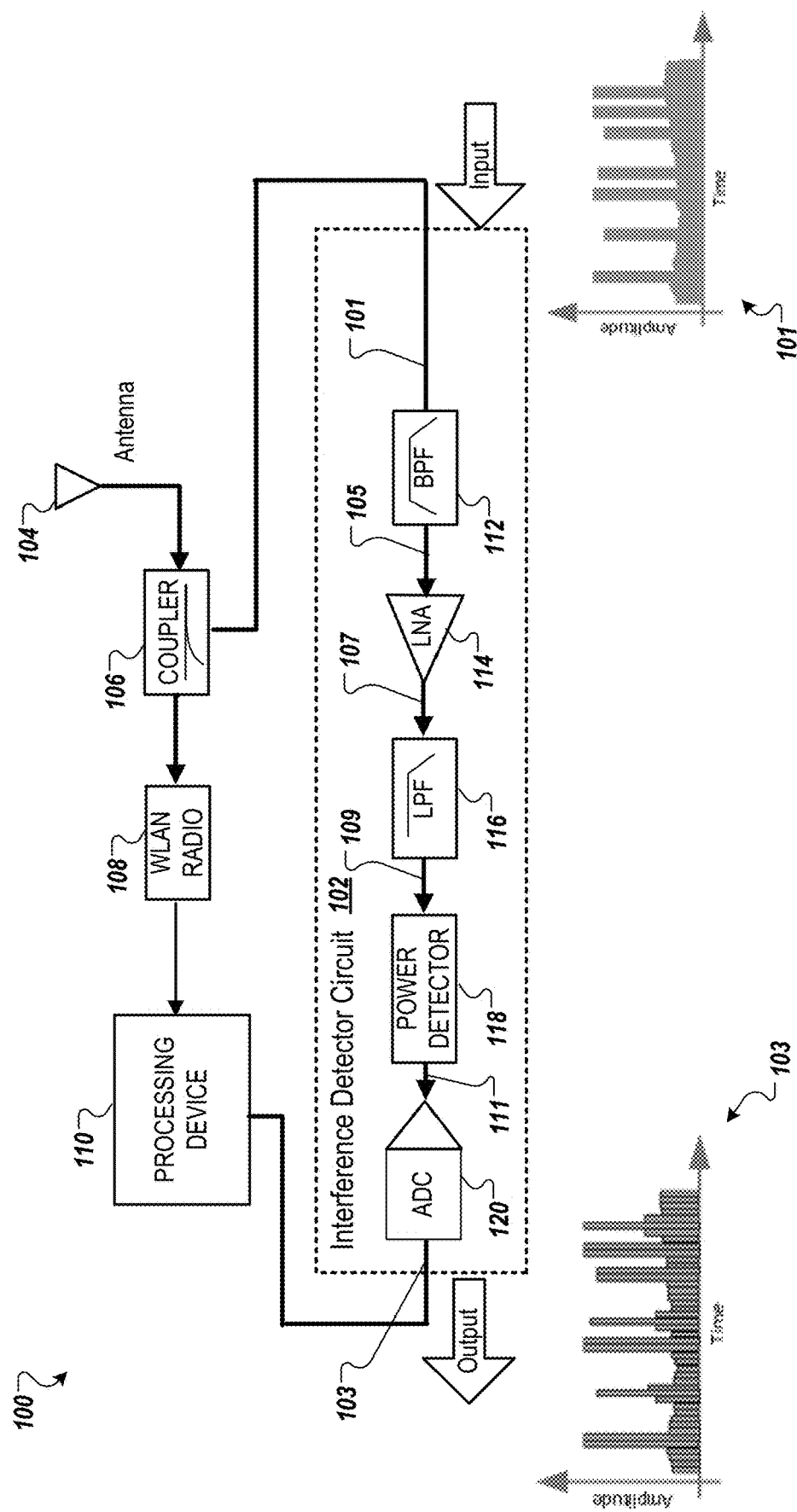
FIG. 1 is a block diagram of a wireless device with an interference detector circuit according to one embodiment.

Technologies directed to a wireless device with a Radio Frequency (RF) Decibel-Scaled Wireless Interference Detector that provides accurate energy readings of a channel through decibel-scaled output voltage are described. The 2.4 GHz and 5 GHz industrial, scientific, and medical (ISM) radio bands allow unlicensed wireless communications. Due to its unlicensed nature, many short ranged, low power wireless communication systems operate in these frequency bands. As such, there is a limited de-license spectrum in various locations. Wireless devices include wireless local area network (WLAN) radios that operate in the 2.4 GHz and 5 GHz bands and utilize various WLAN protocols, such as the Wi-Fi® protocols (e.g., 802.11n, 802.11ac, or the like). Due to the unlicensed nature of these frequency bands, wireless devices can interfere with one another. Similarly, other devices can radiate electromagnetic energy that also causes interference for these radios.

Traditional wireless devices use the clear channel assessment (CCA) technology to detect whether a wireless medium is "busy." The wireless medium is considered "busy" when the congestion level (also referred to as channel busyness) on the wireless medium is above a threshold amount, the threshold amount being greater than an expected noise level (referred to as "noise floor"). The problem of using the CCA technology for measuring the channel busyness is that the CCA technology is affected by the noise floor and receiver gain stages of the wireless device performing the CCA measurement. A traditional wireless device performs periodic noise floor calibration to determine its noise floor. The period calibration is impacted by the noise level at the time of the calibration; thus, affecting a signal-to-noise ratio (SNR) that the wireless device uses to derive a Received Signal Strength Indicator (RSSI) of neighboring interferers. A neighboring interferer is a device that radiates electromagnetic energy that affects a channel in the wireless medium. A traditional wireless device dynamically adjusts its receiver gain stages in order to receive strong and weak RF signals. The differences in gain stages being used can also directly affect RSSI values being measured. Due to these dynamic variances, a traditional wireless device cannot accurately assess its neighbor's interference range to determine a channel condition on the wireless medium. Moreover, the traditional CCA-based interference detection processes do not distinguish between device types of the neighbor interferers.

Aspects of the present disclosure overcome the deficiencies of traditional wireless devices by providing RF decibel-scaled wireless interference detector technology. The RF decibel-scaled wireless interference detector technology described herein can overcome these deficiencies by using a demodulating logarithmic amplifier that accurately converts an RF input signal to a corresponding decibel-scaled output voltage at nanosecond sampling rates. One method of the wireless device includes receiving a first RF signal via an antenna and converting the first RF signal to a multiple samples using a sampling rate, each sample including a digital value of a decibel-scaled output voltage. The method determines an energy value for each of the samples using a voltage-to-energy lookup table and determines a congestion level of a channel a percentage of time the energy values exceed a threshold within a specified time period.

Aspects of the present disclosure overcome the deficiencies of traditional wireless devices by providing a database of device signatures that can be used to identified and classify an interference source. A device signature is a specific series of pulses transmitted by a device to identify a source of a transmission by the device. The device signature can be defined as a series of pulses of specific amplitude, specific durations, or any combination thereof. For example, a device signature can include a unique combination of signal patterns with one or more pulses of a specified amplitude and a specified duration transmitted by a device. The device signature can be transmitted using a series of frames (also referred to as pulse frames). The device signature can be defined by a remote server for each wireless device in a wireless network. The device signature can also be determined from specific attributes of an interference source, such as a microwave source, a radar source, a cordless phone, or other devices that are not part of the wireless network.

A wireless device can also receive a device signature from an interference source and match the device signature against a database of device signatures to identify and classify the interference source. The database can be a cloud-based signature database. In some cases, to maximize detectability, a remote server (e.g., operating a cloud service for a wireless network) can coordinate transmissions between a group of devices. The remote server can send to each device a list of a device type, a device identifier, a signature, a channel identifier, a channel bandwidth, transmission start and end times for each device in the group. The devices can report the transmission information back to the remote server, including signal strengths of the transmissions. The remote server can periodically send a copy of the most current signature database to the wireless devices in the group. Alternatively, a wireless device in the group can request a copy of the most current signature database. The group can be all wireless devices in a wireless network or a subset of all wireless devices in the wireless network. Some devices can have multiple band pass filters (BPFs) that can be used to match a channel of interest for these transmissions. Various devices are described herein that include WLAN radios operate in the 2.4 GHz and 5 GHz frequency bands and utilize various WLAN protocols, such as the Wi-Fi® protocols (e.g., 802.11n, 802.11ac, or the like). The radios can utilize 2×2 spatial multiplexing Multiple-input-multiple-output (MIMO) and channel bandwidths from 20 MHz to 40 MHz. The radios can see all 5.x GHz channels, including Dynamic Frequency Selection (DFS) channels and can operates at an Equivalent Isotropic Radiated Power (EIRP) up to 36 dBmi, depending on the channel. Alternatively, other types of radios can be used to determine channel congestion levels using the RF decibel-scaled wireless interference detector technology described herein.

FIG. 1 is a block diagram of a wireless device 100 with an interference detector circuit 102 according to one embodiment. In general, the interference detector circuit 102 measures a RF power level of an RF signal 101, converts the RF power to a decibel-scaled output voltage, and outputs samples 103 with digital values of the decibel-scaled output voltage representing the RF power level of the RF signal 101. The wireless device 100 can also include an antenna 104, a coupler 106, a WLAN radio 108, and a processing device 110. The antenna 104 is coupled to the coupler 106. The interference detector circuit 102 and the WLAN radio 108 are coupled to the RF coupler 106. The processing device 110 is coupled to the WLAN radio 108 and the interference detector circuit 102. The processing device 110 can include one or more Central Processing Units (CPUs), microcontrollers, field programmable gate arrays, or other types of processors or processing devices. The processing device 110 can implement processing logic that comprises hardware (e.g., circuitry, dedicated logic, programmable logic, microcode, etc.), software, firmware, or a combination thereof. The processing logic can configure the wireless device 100 to operate according to any of the processes described herein. The processing device 110 can communicate with other devices over the wired interfaces, the wireless interfaces (e.g., WLAN radio 108), or any combination thereof. The wireless device 100 can also include other components, such as one or more memory devices, additional radios, wired interfaces, or the like.

The interference detector circuit 102 can include a single BPF 112 coupled to the coupler 106, a low noise amplifier (LNA) 114, a low-pass filter (LPF) 116, a power detector 118, and an analog-to-digital converter (ADC) 120. The single BPF 112 filters out any frequency components of the RF signal 101 that are outside of a frequency range of the single BPF 112. The frequency range can correspond to a specific channel of a WLAN frequency band. The frequency range can correspond to multiple channels of the WLAN frequency band or to the entire WLAN frequency band. The single BPF 112 outputs a first RF signal 105 (filtered RF signal). The LNA 114 is coupled to the single BPF 112. The LNA 114 amplifies the first RF signal 105 (filtered RF signal) to generate a second RF signal 107 (amplified RF signal). The LNA 114 generates the second RF signal 107 by amplifying the first RF signal 105 while setting a noise floor level for the interference detector circuit 102. The LPF 116 is coupled to the LNA 114. The LPF 116 filters the second RF (amplified RF signal) to generate a third RF signal 109 (filtered RF signal). The LPF 116 generates an intermediate RF signal (i.e., 109) by filtering the second RF signal 107 above a specified cutoff frequency to remove additional noise, such as harmonics or aliases. The LPF 116 outputs the intermediate RF signal as the third RF signal 109 to the power detector 118. The power detector 118 is coupled to the LPF 116. The power detector 118 measures a RF power level of the third RF signal 109 and outputs an output voltage signal 111 that is proportional to the RF power level. The ADC 120 is coupled to the power detector 118. The ADC 120 samples the output voltage signal 111 at a sampling rate and outputs the samples 103, the samples 103 having digital values of the decibel-scaled output voltage representing the RF power level of the RF signal 101.

The processing device 110 is coupled to the ADC 120. The processing device 110 receives the samples 103 from the ADC 120. The processing device 110 can convert each of the digital values in the samples 103 into an energy value using a lookup table. The processing device 110 can determine an energy value for each of the samples 103. The energy values can be considered "energy tones" of the RF signal 101. The lookup table can be stored in a memory storage device coupled to the processing device 110 or memory within the processing device 110. The lookup table maps each amplitude value of a decibel-scaled output voltage to an energy value. As described above, the power detector 118 measures the RF power level of the third RF signal 109 and outputs the output voltage signal 111 that is proportional. The output voltage signal 111 can be a continuous voltage signal whose amplitude represents the RF power level. The power detector 118 scales the RF power level input to an output voltage, referred to as a decibel-scaled output voltage. In particular, the power detector 118 can receive an input signal that measures the RF power level in decibels (e.g., dBm) and outputs a voltage signal that is proportional to the RF power level, but in voltage.

| Vout (V) Decibel-scaled output voltage | Pin (dBm) |
|---|---|
| 0.60 | −20 |
| 0.63 | −21 |
| 0.65 | −22 |
| . . . | . . . |
| 2.05 | −78 |
| 2.08 | −79 |
| 2.10 | −80 |

The processing device 110, using the energy values, can determine a congestion energy level a wireless medium, such as a channel of the WLAN frequency band. In one embodiment, the processing device 110 determines a congestion level of a first channel using the energy values within a time interval. The processing device 110 can measure a distribution of the energy values in the time interval, a percentage of time the energy values exceed a threshold within a specified time period, or other statistical metrics to determine the congestion level of the channel.

In another embodiment, the interference detector circuit 102 can include additional BPFs to filter according to different frequency ranges and/or demodulate the RF signals, such as illustrated and described below with respect to FIG. 2.

Figure 2:
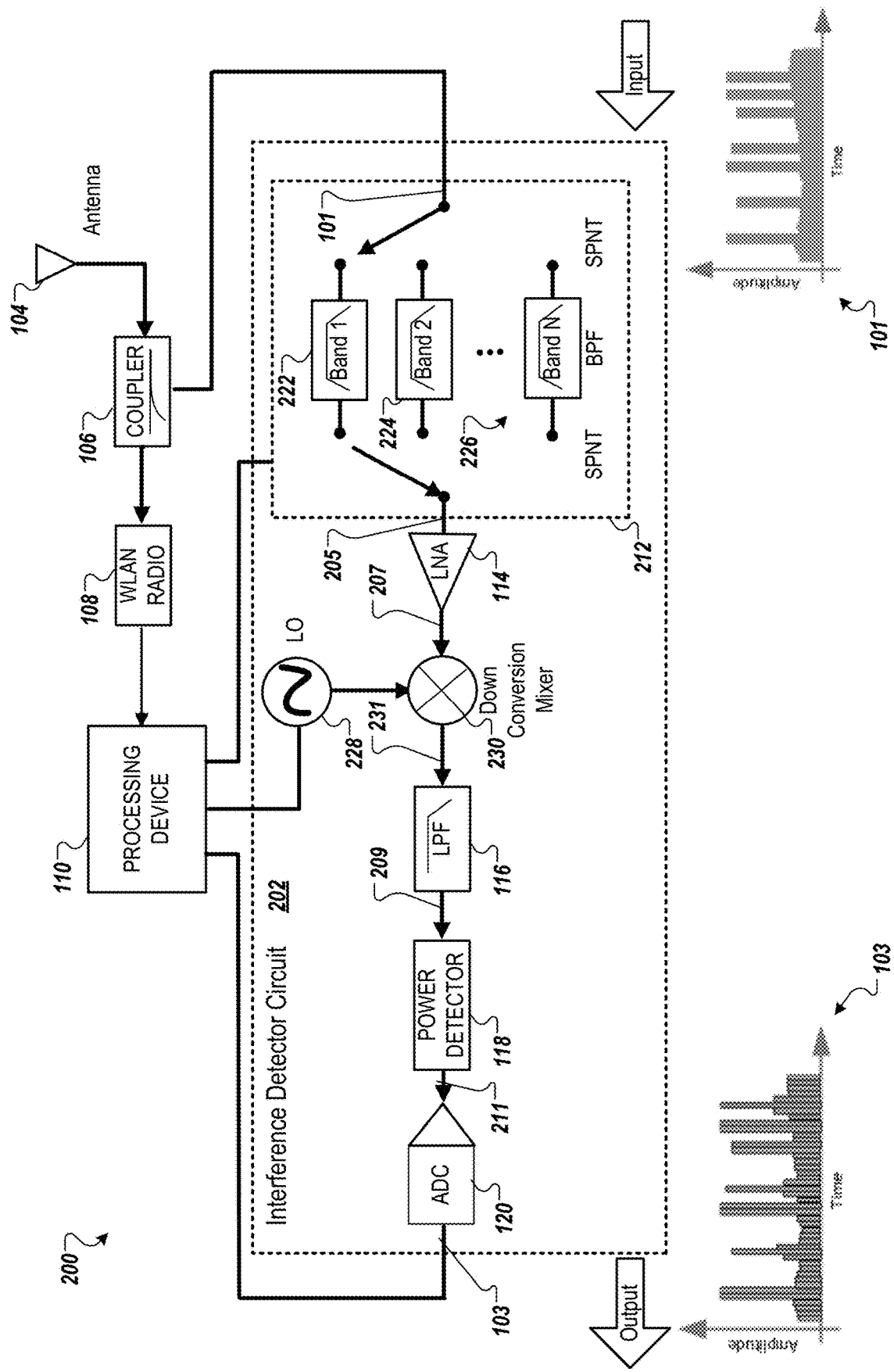
FIG. 2 is a block diagram of a wireless device with an interference detector circuit and multiple band pass filters (BPFs) and switching circuitry according to another embodiment.

FIG. 2 is a block diagram of a wireless device 200 with an interference detector circuit 202 and multiple band pass filters (BPFs) and switching circuitry 212 according to another embodiment. The wireless device 200 is similar to the wireless device 100 described above with respect to FIG. 1, as noted by similar components with the same reference numbers. The wireless device 200 includes multiple BPFs and switching circuitry 212 that can filter the RF signal 101 according to different frequency ranges. For example, the multiple BPFs and switching circuitry 212 can include a first BPF 222 and a second BPF 224. The second BPF 224 is coupled in parallel with the first BPF 222 between the coupler and the LNA. The first BPF 222 filters out any frequency components of the RF signal 101 that are outside of a first frequency range of the first BPF 222. The first frequency range can correspond to a specific channel of a WLAN frequency band. The first frequency range can correspond to multiple channels of the WLAN frequency band or to the entire WLAN frequency band (e.g., 5 GHz). When selected, the first BPF 222 outputs a first RF signal 205 (filtered RF signal). A second BPF 224 filters out any frequency components of the RF signal 101 that are outside of a second frequency range of the second BPF 224. The second frequency range can correspond to a specific channel of a WLAN frequency band. The second frequency range can correspond to multiple different channels of the same WLAN frequency band as the first frequency range or to a different WLAN frequency band (e.g., 2.4 GHz) than the first BPF 222. When selected, the second BPF 224 outputs the first RF signal 205 (filtered RF signal). Alternatively, the multiple BPFs and switching circuitry 212 can include one or more additional BPFs 226 that can each filter according to a different channel or different frequency range as described above. The processing device 110 can control the multiple BPFs and switching circuitry 212 to selectively couple any one or more of the BPFs to the LNA 214.

The interference detector circuit 202 can include the multiple BPFs and switching circuitry 212, the LNA 114, the LPF 116, the power detector 118, and the ADC 120. The LNA 114 is coupled to the multiple BPFs and switching circuitry 212. The LNA 114 amplifies the first RF signal 205 (filtered RF signal) to generate a second RF signal 207 (amplified RF signal). The LPF 116 can be coupled to the LNA 114. The LPF 116 filters the second RF (amplified RF signal) to generate a third RF signal 209 (filtered RF signal). The power detector 118 is coupled to the LPF 116. The power detector 118 measures a RF power level of the third RF signal 209 and outputs an output voltage signal 211. The ADC 120 is coupled to the power detector 118. The ADC 120 samples the output voltage signal 211 at a sampling rate and outputs the samples 103, the samples 103 having digital values of the decibel-scaled output voltage representing the RF power level of the RF signal 101. As described above, the processing device 110 receives the samples 103 from the ADC 120 and converts each of the digital values in the samples 103 into an energy value (e.g., energy tone) using a lookup table. The processing device 110, using the energy values, can determine a congestion energy level a wireless medium, such as a channel of the WLAN frequency band.

Alternatively, the interference detector circuit 202, as illustrated in FIG. 2, also includes a local oscillator (LO) 228 coupled to the processing device 110 and a mixer 230 coupled to the LO 228. The LO 228 can be controlled by the processing device 110 to generate a carrier signal with a carrier frequency for mixing within an incoming RF signal. The LO 228 can be controlled by the processing device 110 as a sliding LO. The mixer 230 receives the carrier signal and the second RF signal 207 from the LNA 114. The mixer 230 down-converts a first frequency of the second RF signal 207 to a second frequency (e.g., carrier frequency set by the LO 228) that is lower than the first frequency. The second frequency can be considered an intermediate frequency (IF). The mixer 230 can output a demodulated signal 231 to the LPF 116. The demodulated signal 231 represents the second RF signal 207 but at a lower frequency. The interference detector circuit 202 demodulates the first RF signal 205 and outputs the output voltage signal as samples 103, each having a decibel-scaled output voltage.

FIG. 3A illustrates a first device signature 300 with a first series of pulses that identifies a first wireless device 302 according to one embodiment. The first series can be represented digitally as a digital sequence of 1's and 0's that create the pulses. Each individual pulse can be represented as a first amount of time that the signal is high (turned on) and a second amount of time that the signal is low (turned off). The particular pattern of pulses, such as illustrated in FIG. 3A, can be transmitted by the first wireless device 302 as a method identifying a subsequent transmission of data as being transmitted by the first wireless device 302. The first device signature 300 can be assigned to the first wireless device 302. Alternatively, the first device signature 300 can be assigned to a particular radio of the first wireless device 302. The first device signature 300 can be different than other device signatures assigned to other devices in the wireless network, such as illustrated and described with respect to FIG. 3B.

FIG. 3B illustrates a second device signature 320 with a second series of pulses that identifies a second wireless device 322 according to one embodiment. The second series can be represented digitally as a digital sequence of 1's and 0's that create the pulses. Each individual pulse can be represented as a first amount of time that the signal is high (turned on) and a second amount of time that the signal is low (turned off). The particular pattern of pulses, such as illustrated in FIG. 3B, can be transmitted by the second wireless device 304 as a method identifying a subsequent transmission of data as being transmitted by the second wireless device 304. The second device signature 320 can be assigned to the second wireless device 304. Alternatively, the second device signature 320 can be assigned to a particular radio of the second wireless device 304. The second device signature 320 can be different than other device signatures assigned to other devices in the wireless network.

It should be noted that other interference sources (neighboring interferers) can be present in an environment with the wireless devices in a wireless network. The other interference sources can be microwave ovens, cordless phones, personal area network (PAN) devices, radars, or the like. The interference detector circuits, as described herein, can be used to identify signal patterns of these sources, classify these signal patterns, and store information in the signature database about these non-network interference sources. For example, devices that utilize the predetermined device signatures can recognize new interference sources in order to mitigate the interference source. For example, if microwave interference is detected, the wireless device can report information about the microwave interference to the remote server to be stored in the device signature database. The wireless device can enable microwave coexistence technologies or avoid the channel for a particular time of day where the microwave interference is known to be present as determined from the timestamp fields in the device signature database. The remote server can send the device signature database, including information for non-network interference sources to the wireless devices in the wireless network so they can enable microwave coexistence technologies or avoid the channel for the particular time of day.

As described herein, a first wireless device can detect a device signature as well as measure signal strengths of a transmission by a second wireless device. The transmission can be scheduled or coordinate between the two devices, as well as scheduled or coordinated by a remote server. The first wireless device can receive a first command from another device, such as a remote server or another wireless device in the wireless network. The first command causes the first wireless device to send a) a first device signature of the first wireless device and ii) first data in a first transmission on a first channel with a first channel bandwidth and between a first start time and a first end time. Alternatively, the first wireless device can receive a second command from another device, such as a remote server or another wireless device in the wireless network. The second command causes the first wireless device to monitor for a second device signature for a second wireless device and a second transmission on a first channel with a second channel bandwidth and between a second start time and a second end time. The first wireless device, can receive the second device signature and the second transmission, detect the second device signature, and measure a signal strength of the second transmission. The first wireless device can generate and send a first report to the other device, such as the remote server or the other wireless device in the wireless network noted above. The first report includes information identifying a second device type, a second device identifier, the second device signature, the signal strength of the second transmission, the first channel, the second channel bandwidth, the second start time, and the second end time. Similarly, the remote server or other wireless device can send similar commands to the second wireless device to transmit the second transmission to the first wireless device or to monitor for a first transmission from the first wireless device. The second wireless device can measure a signal strength of the first transmission and can generate and send a second report to the remote server or other wireless device in the wireless network noted above. The second report includes information identifying a first device type of the first wireless device, a first device identifier of the first wireless device, the first device signature, the signal strength of the first transmission, the first channel, the first channel bandwidth, the first start time, and the first end time, such as illustrated in FIG. 3C.

FIG. 3C illustrates a number of column types 340 for each row in a signature database according to one embodiment. The number of column types 340 can represent fields or attributes for which values are collected and sent in the reports by the wireless devices in the wireless network. For example, the number of column types 340 can include a device type field 342, a device identifier field 344, a device signature field 346, a signal strength field 348, a channel field 350, a channel bandwidth field 352, a first active timestamp field 354, and a last active timestamp field 356. The number of column types 340 can represent the columns of the signature database stored by the remote server or any of the local signature databases stored at individual wireless devices in the wireless network. That is, for a row for a particular device, as noted by the device identifier field 344, the row can include device type data in the device type field 342, the device identifier in the device identifier field 344, the device signature in the device signature field 346, the signal strength (e.g., RSSI value or other indicia of the strength of transmissions) in the signal strength field 348, channel data in the channel field 350, channel bandwidth data in the channel bandwidth field 352, a first timestamp in the first active timestamp field 354, and a second timestamp in the last active timestamp field 356. The first timestamp can be recorded when the transmission starts to be received by the wireless device and the second timestamp can be recorded when the transmission ends.

As described herein, the sending of the device signature and transmission can also be coordinated by the cloud (e.g., remote server) to maximize detectability and minimize false detects. To maximize detectability, the cloud coordinates a group of devices by sending to each device a list, such as illustrated in FIG. 3D.

Figure 3D:
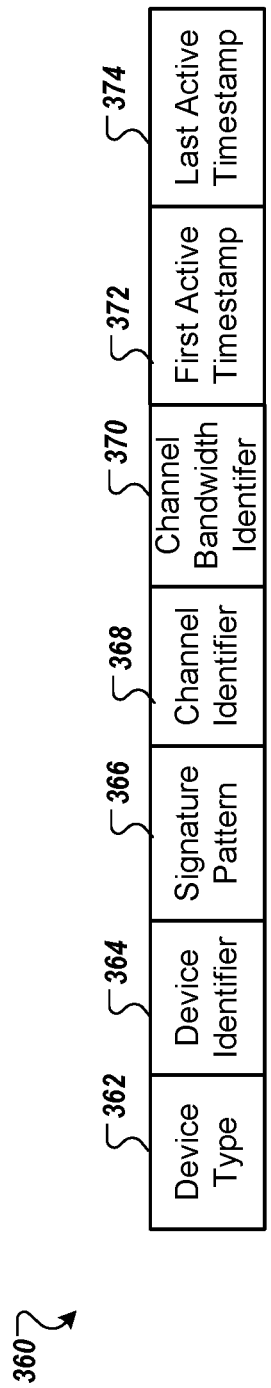
FIG. 3D illustrates a list that is sent by a remote server to wireless devices in a wireless network according to one embodiment.

FIG. 3D illustrates a list 360 that is sent by a remote server to wireless devices in a wireless network according to one embodiment. The list 360 includes, for each device in the wireless network, a device type field 362, a device identifier field 364, a device signature field 366, a channel identifier field 368, a field 370 with a channel bandwidth, and fields 372, 374 with transmission start and end periods, respectively. In some cases, the channel specified in the channel identifier field 368 can be used to switch an appropriate BPF into the receive path in the interference detector circuit, as described herein. This can be done to match the channel of interest.

In one embodiment, the processing device receives the RF signal and detects the device signature in the RF signal. The processing device can receive a transmission from another device and can measure a signal strength, such as a RSSI value for the transmission. Alternatively, the processing device can control the interference detector circuit to measure a congestion level for the transmission. The processing device can generate a report of the transmission that includes the signal strength, the congestion level, or any combination thereof.

As described above, the first wireless device can i) receive a first command to send a first device signature for the first wireless device and a first transmission of data to a second wireless device or ii) receive a second command to monitor for a second device signature and a second transmission of data from the second wireless device. The first command can specify that the first wireless device send the first device signature, a device identifier of the first wireless device, and device type data of the first wireless device. The first command can specify a channel identifier, a channel bandwidth identifier, a start transmission time, and an end transmission time to be used by the first wireless device. The second command can include a device identifier of the second wireless device, device type data of the second wireless device, an expected second device signature of the second wireless device, an expected channel, an expected channel bandwidth, an expected transmission start time, and an expected transmission end time. In other embodiments, the remote server can send a message with a command to monitor or a command to send and the data described above, such as the device identifier, device type, channel identifier, or the like. For example, a wireless device can receive a message from the remote server, the message include a command to monitor for an incoming transmission from a second wireless device in the wireless network. The message further includes a device identifier of the second wireless device in the wireless network, a device type of the second wireless device, a device signature of the second wireless device, a channel identifier for the incoming transmission, a channel bandwidth identifier for the incoming transmission, a transmission start time for the incoming transmission, and a transmission end time for the incoming transmission. It should be noted that the first RF signal can be received after the transmission start time. The wireless device, or another wireless device, can receive a second message from the remote server, the second message include a second command that causes the wireless device to send a device signature of the wireless device and data using a specified channel, at a specified channel bandwidth, at a transmission start time, and finishing at a transmission end time. Responsive to the second command, the wireless device sends a series of frames in a pattern of the device signature and the data on the specified channel, at the specified channel bandwidth, between the transmission start time and the transmission end time.

Before or after receiving the first command, the first wireless device can receive an initial signature database from the remote server. Subsequently, the first wireless device can receive a first signature database from a third wireless device. The first wireless device can merge the first signature database with the initial signature database. The first wireless device can also send the signature database (merged or unmerged database) to a fourth wireless device or to the remote server. The first wireless device can receive a signature database from a remote server, where the signature database includes multiple device signatures. The multiple device signatures can include device signatures of devices that are part of a same wireless network as the first wireless device. The multiple device signatures can also include device signatures of devices that are not part of the wireless network.

Figure 4:
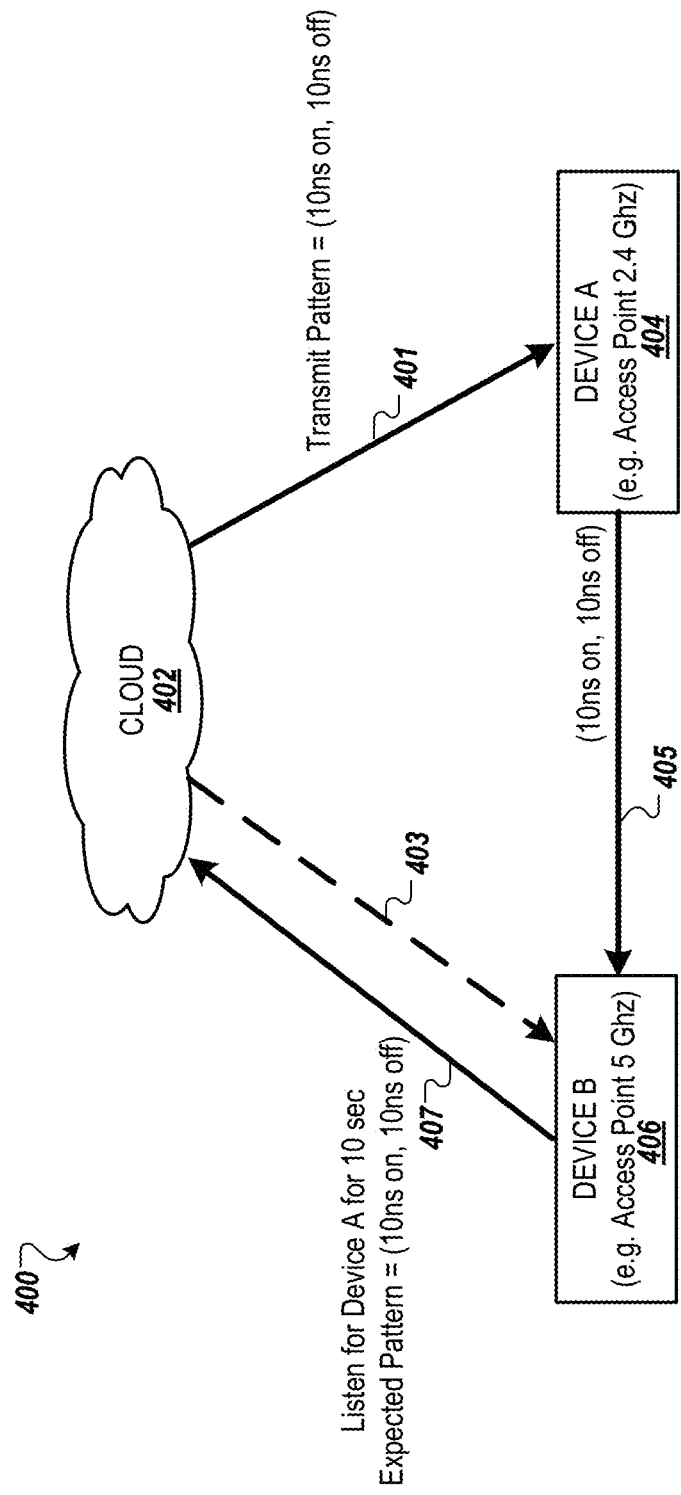
FIG. 4 illustrates a cloud-based process for identifying and classifying interference sources according to one embodiment.

FIG. 4 illustrates a cloud-based process 400 for identifying and classifying interference sources according to one embodiment. The cloud-based process 400 can be implemented in processing logic in a web service at a remote server 402 (also referred to as a cloud service or simply the "cloud." The remote server 402 can send a first command 401 that causes a first wireless device 404 (labeled as Device A) to send i) a first device signature of the first wireless device 404 and ii) first data in a first transmission on a first channel with a first channel bandwidth and between a first start time and a first end time. For example, the remote server 402 can instruction the first wireless device 404 to send a transmit pattern, such as 10 ns on, 10 ns off), to a second wireless device 406 (labeled as Device B). Optionally, the remote server 402 can send a second command 403 that causes the second wireless device 406 to monitor for the first device signature and the first transmission on the first channel with the first channel bandwidth and between the first start time and the first end time. That is, the remote server 402 can instruct the second wireless device 406 to listen for the transmit pattern being sent by the first wireless device 404. The remote server 402 can also instruct the second wireless device 406 to not transmit RF signals between the first start time and the first end time. After receiving the first command 401, the first wireless device 404 sends i) the first device signature of the first wireless device 404 (e.g., transmit pattern of 10 nanoseconds (ns) on, 10 ns off) and ii) first data in a first transmission 405 on the first channel with the first channel bandwidth and between the first start time and the first end time. The second wireless device 406 receives i) the first device signature and ii) the first data in the first transmission 405. The second wireless device generates and sends a first report 407. The first report 407 includes first information identifying a first device type of the first wireless device 404, a first device identifier of the first wireless device 404, the first device signature, a first signal strength of the first transmission 405, the first channel, the first channel bandwidth, the first start time, and the first end time. The remote server 402 receives the first report 407 and store the first information in a signature database associated with the remote server 402.

In a further embodiment, the remote server 402 sends a third command (not illustrated in FIG. 4) that causes the second wireless device 406 to send iii) a second device signature of the second wireless device 406 and iv) second data in a second transmission on a second channel with a second channel bandwidth and between a second start time and a second end time. The remote server 402 can optionally send a fourth command that causes the first wireless device 404 to monitor for (i.e., listen for or expect to receive) iii) the second device signature and iv) the second transmission on the second channel with the second channel bandwidth and between the second start time and the second end time. In response to the first wireless device 404 receiving the second device signature and the second transmission, the first wireless device 404 generates and sends a second report to the remote server 402. The second report includes second information identifying a second device type of the second wireless device 406, a second device identifier of the second wireless device 406, the second device signature, a second signal strength of the second transmission, the second channel, the second channel bandwidth, the second start time, and the second end time. The remote server 402 stores the first information and the second information in a signature database.

In a further embodiment, the remote server 402 receives a third report (not illustrated in FIG. 4) from the first wireless device 404. The third report includes third information identifying a third device type of an interference source, a third device identifier, a third device signature, a third signal strength of electromagnetic energy received from the interference source, a third channel, a third channel bandwidth, a third start time, and a third end time. The first wireless device 404 and the second wireless device 406 are part of a wireless network and the interference source can be a device that is not part of the wireless network. The remote server 402 can store the third information in the signature database.

As described herein, the remote server 402 can send a copy of the signature database to each device in a wireless network. The copy of the signature database can be sent using probe responses. Similarly, the reports can be sent using probe responses. The devices of the wireless network can request the copy or the remote server 402 can periodically send the copy of the signature database to one or more of the devices in the wireless network.

In one embodiment, each wireless device in the wireless network transmits its signature using a series of pulse frames for the receiver to detect and recognize the respective transmitting device. The device signature can be transmitted using probe response frames. For a 2.4 GHz radio, the probe response can be sent at 1 Mbps. For a 5 GHz radio, the probe response can be sent at 6 Mbps.

Upon receiving the pulse pattern, the receiver device matches the pulse pattern against the signature database to determine the interferer device's identity and whether the device is part of the receive device's wireless network. Each device maintains a database of the surrounding devices and their signatures. Each device can periodically propagate its detected signature database to surrounding neighbors using probe responses. Each device can also propagate the detected signature database to its neighbors over the cloud, i.e., via the remote server. Upon receiving the detected signature database from neighbors, the device updates its own detected signature database with the union of the neighbor's signature database. The detected signature database can include device type, device identifier, device signature, signal strength, channel, channel bandwidth, first active timestamp, and last active timestamp, such as illustrated and described above with respect to FIG. 3C. The device type can be Access Point (AP), Station, Bluetooth® device, a microwave device, a radar device. The device identifier can be an address of the device, such as Media Access Control (MAC) address, a universally unique identifier (UUID), a globally unique identifier, or the like. The MAC address is a hardware identification number that uniquely identifies each device on a wireless network. The UUID can be a 128-bit number used to identify information in computer systems or networks. Signal strength, channel, and channel bandwidth can be data reported by the interference detector circuit (also referred to herein as an radio frequency to direct current (RF-DC) detector) or from a neighbor report. The first and last active timestamps are used to determine if the interference is still present and when it was present on a wireless medium. An example of report propagation is illustrated and described below with respect to FIG. 5.

Figure 5:
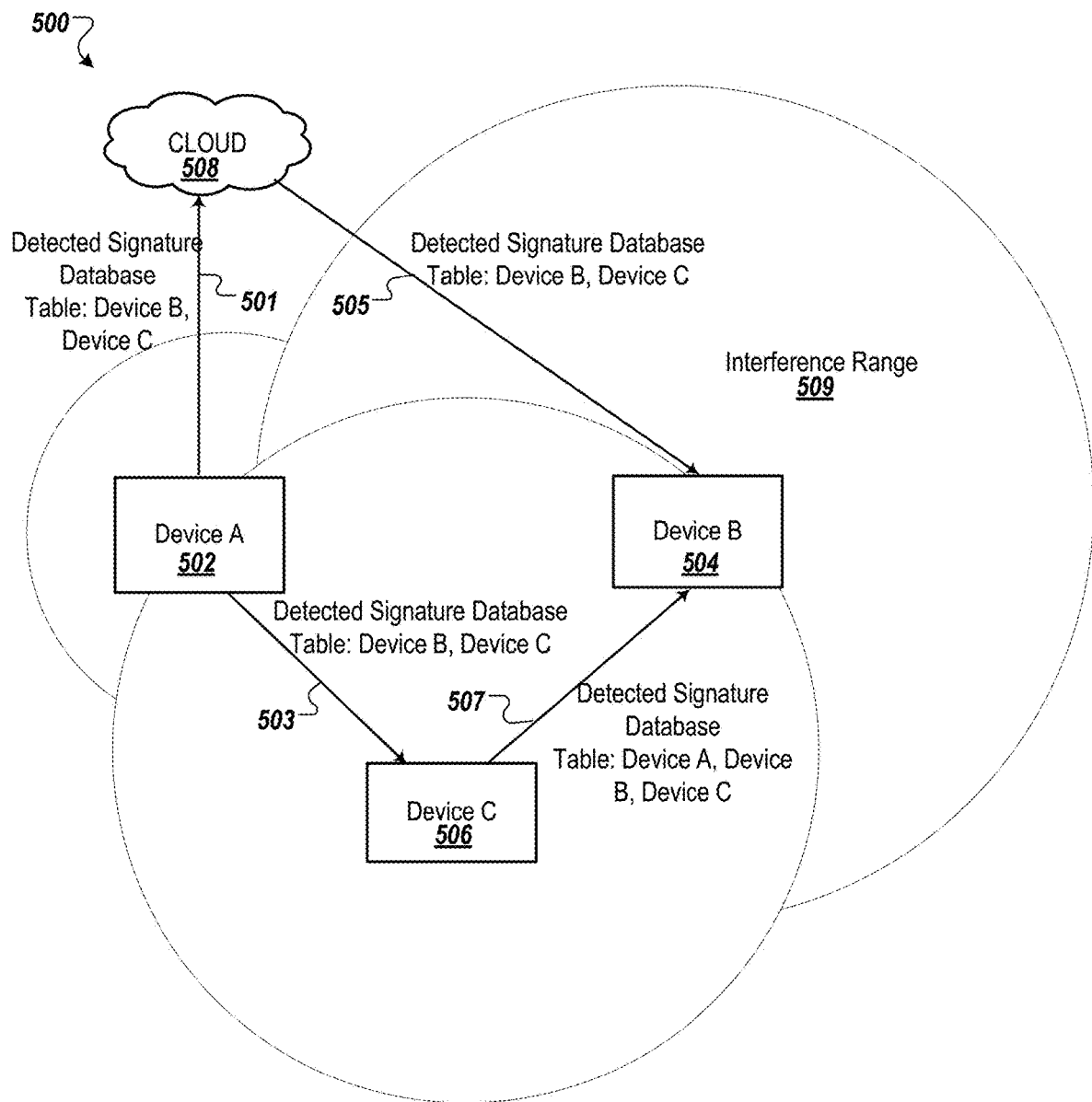
FIG. 5 illustrates a cloud-based process for identifying and classifying interference sources according to another embodiment.

FIG. 5 illustrates a cloud-based process 500 for identifying and classifying interference sources according to another embodiment. For the cloud-based process 500, a first device 502 (labeled as Device A) can receive RF signals from a second device 504 (labeled as Device B), but the second device 504 does not receive RF signals from the first device 502 (colloquially referred to as Device A "sees" device B but device B "does not see" device A). A third device 506 (labeled as Device C) and a remote server 508 (i.e., cloud) can relay the signatures database to the second device 504 (Device B). For example, the first device 502 can send a first copy 501 of the detected signature database, including a table with information for Device B, and Device C, to the remote server 508. The first device 502 can also send a second copy 503 of the detected signature database to the third device 506. The remote server 508 can send a third copy 505 of the detected signature database to the second device 504. The third device 506 can send a fourth copy 507 of the detected signature database to the second device 504. As shown in FIG. 5, the first device 502 (and the third device 5060 are within an interference range 509 of the second device 504. The propagated signature database can be used by the second device 504 to assess the first device 502 as being an interference source, even though the second device 504 "does not see" the first device 502.

Figure 6:
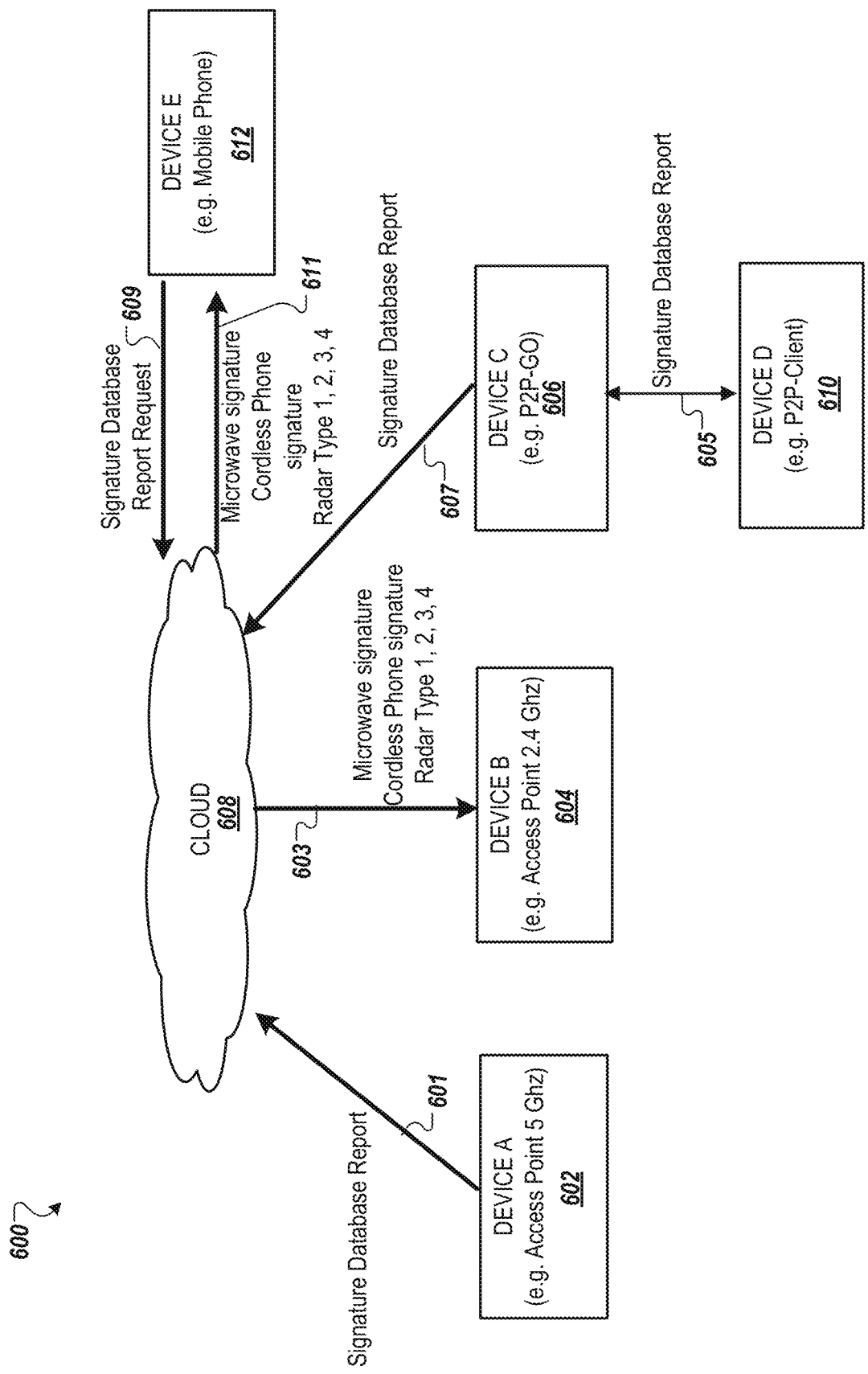
FIG. 6 illustrates a cloud-based process for identifying and classifying interference sources according to another embodiment.

FIG. 6 illustrates a cloud-based process 600 for identifying and classifying interference sources according to another embodiment. For the cloud-based process 600, a first wireless device 602 (labeled as Device A) can send a report 601 (also referred to as signature database report) to a remote server 608 (i.e., cloud service). The first wireless device 602 can be an access point (AP) that operates in the 5 GHz frequency band. The remote server 608 can maintain a signature database and can update the signature database based on the report 601. The remote server 608 can send a copy 603 of the signature database to a second wireless device 604 (labeled as Device B). The second wireless device 604 can be an AP that operates in the 2.4 GHz frequency band. A third wireless device 606 can send a copy 605 of the signature database to a fourth wireless device 610. Alternatively, the third wireless device 606 and the fourth wireless device 610 can exchange their respective signature databases. The third wireless device 606 can be provide AP like functionality as a peer-to-peer group owner (P2P-GO) and the fourth wireless device 610 can be a peer-to-peer client (P2P-Client) of the P2P-GO. The third wireless device 606 can send a repot 607 to the remote server 608 and the remote server 608 can update the signature database. The remote server 608 can send copies of the updated signature database to the other devices in the wireless network. The signature database stored at the remote server 608 can include a microwave signature, a cordless phone signature, and four radar signature types (labeled Radar Type 1, 2, 3, 4). Any of the devices can request a copy of a current signature database from the remote server 608. For example, a fifth wireless device 612 (labeled as Device E) can send a request 609 for the signature database to the remote server 608. The remote server 608 sends a copy 611 of the signature database to the fifth wireless device 612. The fifth wireless device 612 can be a mobile phone.

In another embodiment, a wireless device can receive a first report from a second device and a second report from a third device and can aggregate the first report and the second report into a third report. The wireless device can send the third report to the remote server 608. This can be done to reduce network traffic to send the reports to the remote server 608. As described herein, the first report can include a first device type, a first device identifier, a first device signature, a first channel identifier, a first channel bandwidth, first transmission start and end times of a first transmission received by the second device. The second repot can include a second device type, a second device identifier, a second device signature, a second channel identifier, a second channel bandwidth, second transmission start and end times of a first second received by the third device.

Figure 7:
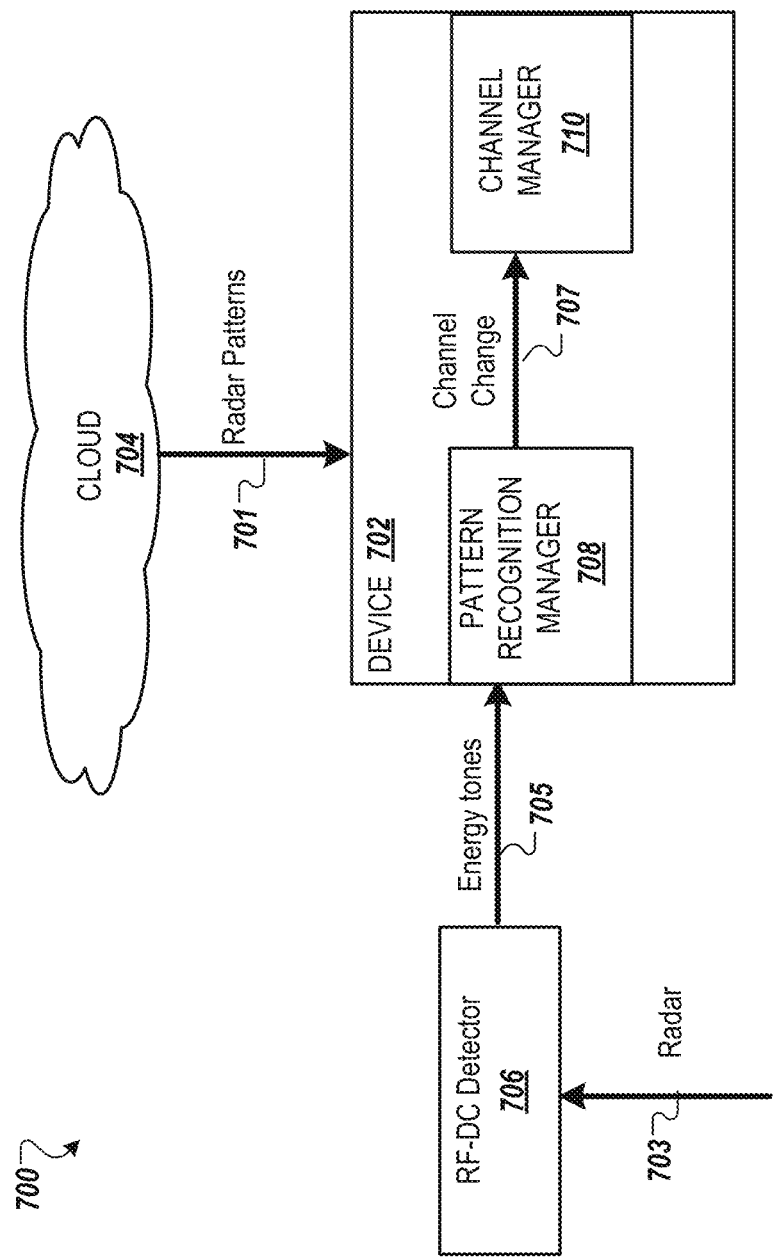
FIG. 7 illustrates a cloud-based process for identifying and classifying radar patterns from interference sources according to another embodiment.

FIG. 7 illustrates a cloud-based process 700 for identifying and classifying radar patterns from interference sources according to another embodiment. For the cloud-based process 700, a device 702 can receive a copy 701 of a signature database from a remote server 704. The signature database includes radar patterns. The device 702 can be coupled to a RF-DC detector 706. The RF-DC detector 706 can operate in a similar manner as the interference detector circuit 102 of FIG. 1 or the interference detector circuit 202 of FIG. 2. The RF-DC detector 706 can detect a radar event 703. The RF-DC detector 706 can detect a radar pattern and can send corresponding energy tones 705. As described above, the energy tones 705 can be energy values resulting from a lookup table that maps each amplitude of the decibel-scaled output voltage to an energy value. In this embodiment, the RF-DC detector 706 can include the components of the interference detector circuit 102 or 202, as well as a processing device that can receive the samples and convert the digital values of the output voltage to the energy values (e.g., energy tones 705). The RF-DC detector 706 can also include a memory device that can store the lookup table, data, and/or instructions executed by the processing device.

The device 702 receives the energy tones 705 and compares the energy tones 705 against the radar patterns in the signature database. The device 702 can detect that the energy tones 705 match a radar pattern in the signature database. The device 702 can take one or more actions in response to the radar pattern in the radar event 703 matching the radar pattern in the signature database. For example, the device 702 can change a channel of a radio of the device 702.

In the depicted embodiment, the RF-DC detector 706 is in a separate device from the device 702. The device 702 can be any wireless device that does not have radar detection capabilities when manufactured and deployed in a wireless network. By coupling of the RF-DC detector 706 to the device 702, the device 702 can operate with radar detection capabilities using the RF-DC detector 706 and the signature database. The radar patterns in the signature database can be previously collected by the RF-DC detector 706 or by other devices in the wireless network that reported the radar patterns to the remote server 704. In one embodiment, the RF-DC detector 706 is integrated into a pluggable device housing that can be plugged into a port of the device 702, such as a USB port. In another embodiment, the RF-DC detector 706 can be part of a device that includes a communication component that can send the energy tones 705 over a wired connection or a wireless connection to the device 702.

In one embodiment, the device 702 includes a pattern recognition manager 708 and a channel manager 710. The pattern recognition manager 708 and the channel manager 710 can be processing logic that comprises hardware (e.g., circuitry, dedicated logic, programmable logic, microcode, etc.), software, firmware, or a combination thereof. The pattern recognition manager 708 receives the energy tones 705 from the RF-DC detector 706 and compares the energy tones 705 against the radar patterns in the signature database. When the energy tones 705 match a pattern in the signature database, the pattern recognition manager 708 can send a command 707 to the channel manager 710. The command 707 can be a command to change a channel of a radio of the device 702. The channel manager 710 can receive the command 707 and change the channel of the radio. For example, the radio can be operating on a DFS channel. In response to the command 707, the channel manager 710 can cause the radio to switch from the DFS channel to a backup non-DFS channel. In other embodiments, the pattern recognition manager 708 and the channel manager 710 can perform other operations in response to the radar event 703.

In one embodiment, the RF-DC detector 706 can also provide a DFS service to one or more devices, including device 702 that does not have radar detection hardware. With the predetermined radar signatures in the signature database, the device 702 can recognize the presence of radar and steer the device 702 to vacate the DFS channel.

Figure 8:
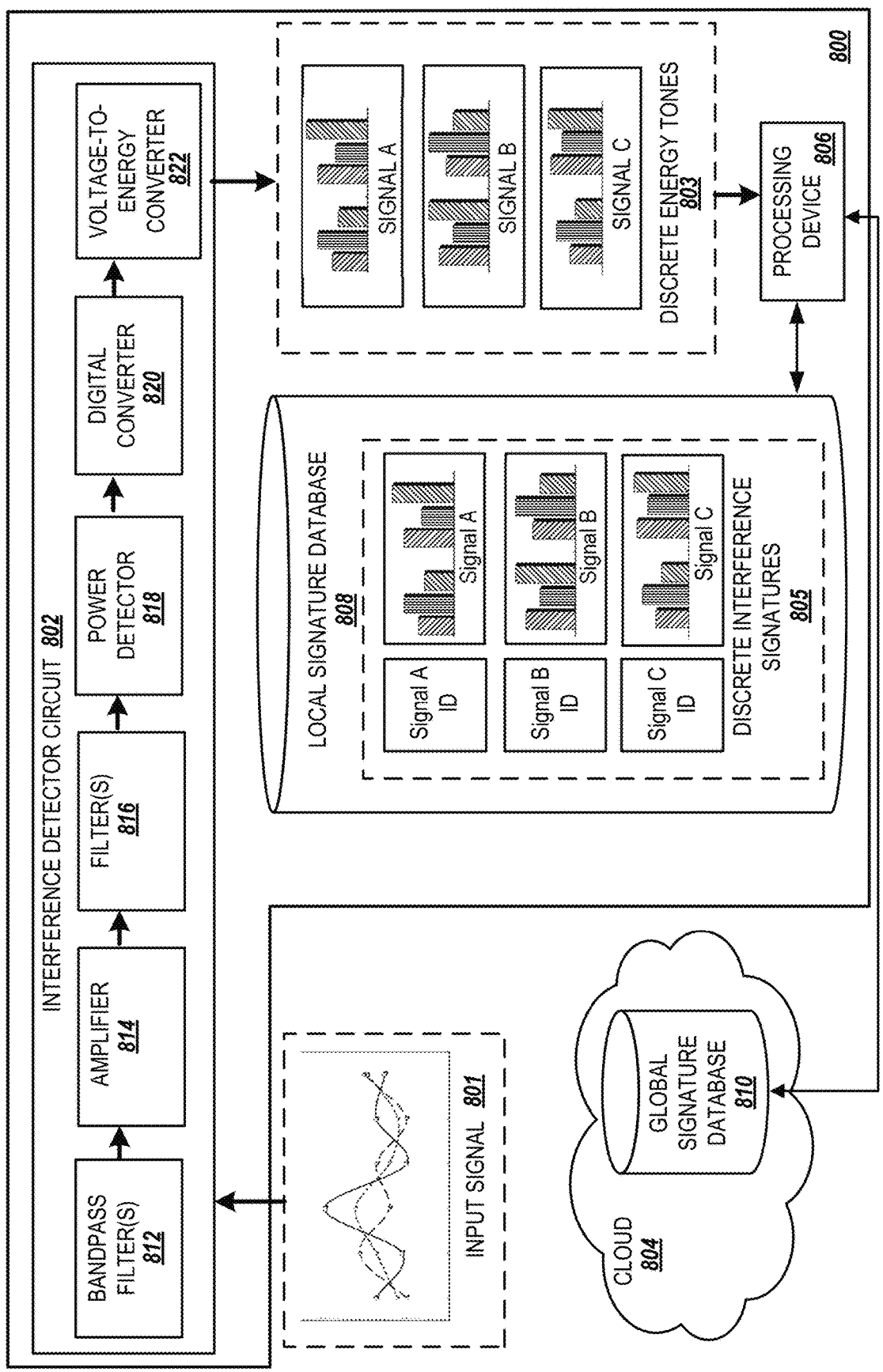
FIG. 8 is a network diagram of a wireless device with an interference detector circuit and a remote server according to one embodiment.

FIG. 8 is a network diagram of a wireless device 800 with an interference detector circuit 802 and a remote server 804 according to one embodiment. The wireless device 800 includes the interference detector circuit 802, a processing device 806, and a local signature database 808. The local signature database 808 can be stored in one or more memory devices coupled to the processing device 806. The remote server 804 can be a collection of servers organized in a cloud computing system. The remote server 804 can store a global signature database 810. The interference detector circuit 802 includes one or more BPFs 812, one or more amplifiers 814, one or more filter 816, a power detector 818, a digital converter 820, and a voltage-to-energy converter 822. The interference detector circuit 802 can receive an input signal 801. The input signal 801 can be filtered by the one or more BPFs 812, amplified by the one or more amplifiers 814, filtered by the one or more filters 816. The power detector 818 can detect a power level in the amplified and filtered signal and output an analog voltage signal to the digital converter 820. The digital converter 820 converts the analog voltage signal to discrete digital values and outputs the discrete digital values to the voltage-to-energy converter 822 that converts the discrete digital values to energy values. The voltage-to-energy converter 822 outputs the energy values as discrete energy tones 803 to the processing device 806. The processing device 806 can compare the discrete energy tones 803 from the interference detector circuit 802 against discrete interference signals 805 stored in the local signature database 808. The discrete interference signals 805 can be stored as a signal pattern and a signal identifier associated with each device. The signal identifier can be a device identifier, such as a MAC address. Additional information can be stored in connection with the discrete interference signals 805, such as device type data, channel data, timestamp data, or the like. When there is no match in the local signature database 808, the processing device 806 can store the discrete energy tones 803 as new entries in the local signature database 808. When the local signature database 808 is updated, the processing device 806 can send a copy of the local signature database (or portions of it) to the remote server 804 to update the global signature database 810. The updates to the local signature database 808 can be sent as a report, such as a signature database report as described herein.

Figure 9:
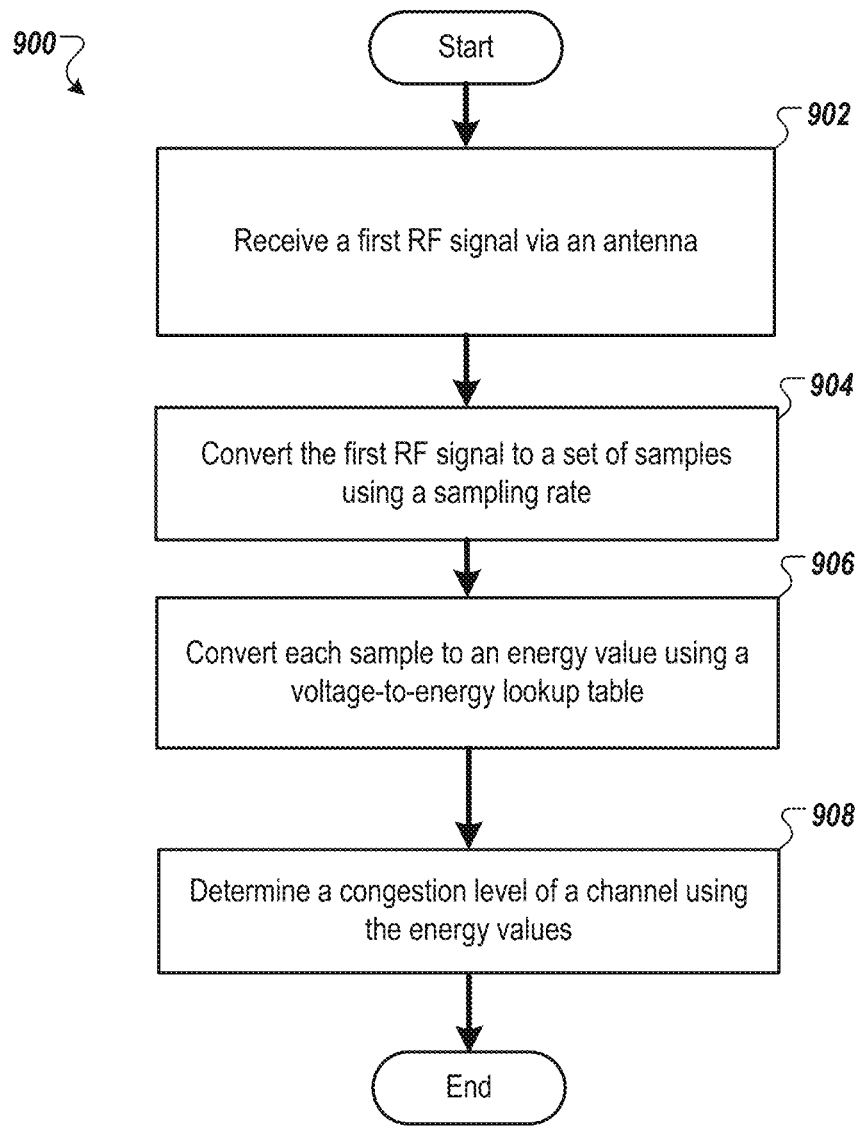
FIG. 9 is a flow diagram of a method of determining a congestion level of a channel according to one embodiment.

FIG. 9 is a flow diagram of a method 900 of determining a congestion level of a channel according to one embodiment. The method 900 may be performed by processing logic that comprises hardware (e.g., circuitry, dedicated logic, programmable logic, microcode, etc.), software, firmware, or a combination thereof. In one embodiment, the method 900 may be performed by any of the devices described herein and illustrated with respect to FIGS. 1-8. The processing logic can be distributed between different components of the interference detector circuit 102 of FIG. 1 or the interference detector circuit 202 of FIG. 2.

Referring back to FIG. 9, the method 900 begins by receiving a first radio frequency (RF) signal via an antenna (block 902). The processing logic converts the first RF signal to a set of samples using a sampling rate (block 904). Each sample of the set includes a digital value of a decibel-scaled output voltage. In one embodiment, the sampling rate is a nanoseconds sampling rate (i.e., a sampling rate in a range of between 1 nanosecond to 100 nanoseconds). In another embodiment, the sampling rate is in a range of between 1 nanosecond to 20 nanoseconds. In one embodiment, the sample rate is 10 nanoseconds. Alternatively, other sampling rates can be used. The processing logic converts each sample of the set to an energy value using a voltage-to-energy lookup table (block 906). The processing logic determines a congestion level of a channel using the energy values (block 908), and the method 900 ends.

In one embodiment, the first RF signal is converted by demodulating and amplifying the first RF signal to generate a second RF signal, measuring a RF power level of the second RF signal, and sampling the RF power level at the sampling rate to generate the set of samples. In another embodiment, the processing logic filters out any frequency components of the first RF signal that are outside of a frequency range of a first channel to obtain the first RF signal. The first RF signal can be converted by generating a second RF signal by amplifying the first RF signal, filtering the second RF signal to obtain a third RF signal, measuring a RF power level of the third RF signal, and sampling the RF power level at the sampling rate to obtain the set of samples.

In another embodiment, each sample of the set of samples is converted by performing a look-up operation to obtain the respective energy value from the voltage-to-energy lookup table.

In other embodiments, the processing logic receives multiple RF signals via the antenna. The processing logic filters out any frequency components of the RF signals that are outside of a first frequency range to obtain the first RF signal. The processing logic can also filter out any frequency components of the RF signals that are outside the RF signals that are outside of a second frequency range to obtain a second RF signal. The processing logic can perform filtering for each of the multiple BPFs that is available in the interference detector circuit. The first frequency range can correspond to a first channel and the second frequency range can correspond to a second channel. The first channel and the second channel can be part of the same frequency band or different frequency bands. The first channel can be an entire range of a first frequency band and the second channel can be an entire range of a second frequency band. Alternatively, the processing logic can filter according to any specified frequency range of interest. The processing logic can convert the second RF signal to a second set of samples using the sampling rate. Like the first set of samples, each of the second set of samples includes a digital value of a decibel-scaled output voltage. The processing logic converts each of the second set of samples to a second energy value using the voltage-to-energy lookup table. The processing logic can determine a second congestion level of the second channel using the second energy values.

In another embodiment, the processing logic receives multiple RF signals via the antenna and the processing logic filters out any frequency components that are outside of a first frequency range, where the first frequency range corresponds to a first frequency band, and filters out any frequency components that are outside of a second frequency band, where the second frequency range corresponds to a second frequency band. The processing logic converts the second RF signal to the second set of samples using the sampling rate and converts each of the second set of samples to a second energy value using the voltage-to-energy lookup table. The processing logic determines a first congestion level of the first frequency band using the energy values and determines a second congestion level of the second frequency band using the second energy values.

In another embodiment, the processing logic down-converts a first frequency of the first RF signal to a second frequency that is lower than the first frequency. The processing logic filters the first RF signal after down-converting to the second frequency. The processing logic measures a RF power level of the first RF signal and samples the RF power level at the sampling rate to generate the set of samples. The processing logic can detect a pulse-modulated signal in the set of samples.

Figure 10:
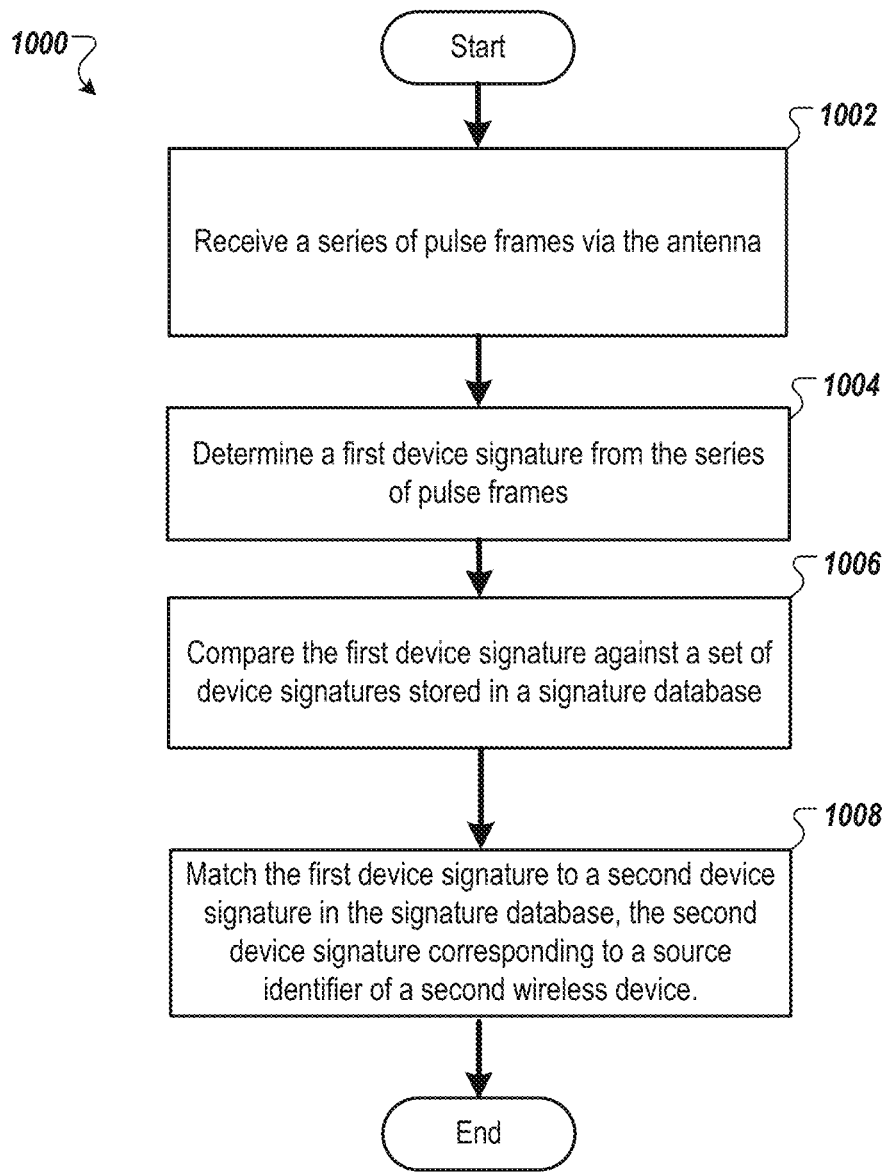
FIG. 10 is a flow diagram of a method of detecting a device signature transmitted by a wireless device in a wireless network according to one embodiment.

FIG. 10 is a flow diagram of a method 1000 of detecting a device signature transmitted by a wireless device in a wireless network according to one embodiment. The method 1000 may be performed by processing logic that comprises hardware (e.g., circuitry, dedicated logic, programmable logic, microcode, etc.), software, firmware, or a combination thereof. In one embodiment, the method 1000 may be performed by any of the devices described herein and illustrated with respect to FIGS. 1-8. The processing logic can be distributed between different components of the interference detector circuit 102 of FIG. 1 or the interference detector circuit 202 of FIG. 2.

Referring back to FIG. 10, the method 1000 begins receiving a series of pulse frames via the antenna (block 1002). The processing logic determines a first device signature from the series of pulse frames (block 1004). The processing logic compares the first device signature against a set of device signatures stored in a signature database (block 1006). Each of the set of device signatures corresponds to each wireless device that is part of a wireless network. Alternatively, the signature database can include device signatures of devices that are not part of the wireless network, such as a microwave source, a radar source, a cordless phone, or the like. The processing logic matches the first device signature to a second device signature of the set of device signatures, the second device signature corresponding to a source identifier of a second wireless device (block 1008), and the method 1000 ends. The second wireless device can transmit the first device signature in connection with a first data transmission. The first data transmission can include the first RF signal that can be used to determine the first congestion level, as described above. Alternatively, the first device signature can be transmitted by the second wireless device in connection with a second data transmission that is used to determine the second congestion level, as described above.

In another embodiment, the processing logic receives a series of pulse frames via the antenna and determines a device signature from the series of pulse frames. The processing logic can determine a source identifier of a second wireless device from the device signature. As described above, the second wireless device can be the device that transmitted the first RF signal or the second RF signal described above.

In one embodiment, the processing logic can send the signature database to a third wireless device in the wireless network or a remote server. The processing logic receives a first signature database from a third wireless device and merges the first signature database with the signature database. The processing logic can send the signature database to a fourth wed or the remote server.

In another embodiment, the processing logic receives a signature database from a remote server, the signature database including a set of device signatures. Each of the set of device signatures corresponds to a device that is either part of a wireless network or that is not part of the wireless network. The processing logic stores the signature database in memory. The processing logic receives a command from the remote server. The command can include a device identifier of a second wireless device in the wireless network, device type data of the second wireless device, a device signature of the second wireless device, a channel, a channel bandwidth, a transmission start time, and a transmission end time. The first RF signal can be received from the second wireless device after the transmission start time. That is, the second wireless device starts to send the first RF signal at the transmission start time. As such, the processing logic receives the first RF signal after the transmission start time. There can be minimal delay between the transmission start time and when the processing logic receives the first RF signal. The processing logic can record a first active timestamp when it starts to receive the first RF signal and a last active timestamp when the transmission is finished.

In another embodiment, the processing logic receives a command from a remote server. The command causes the processing logic to send a device signature of the wireless device and data in a transmission on a specified channel, at a specified channel bandwidth, at a transmission start time, and finishing at a transmission end time. In response, the processing logic sends a series of pulse frames of the device signature and the data on the specified channel, at the specified channel bandwidth, between the transmission start time and the transmission end time.

In one embodiment, a wireless device receives a series of frames and determines a pattern in which the series of frames is received. The pattern can include, for each frame in the series of frames, a first amount of time for which the frame is received and a second amount of time that spans the end of receipt of the frame and beginning of receipt of another frame immediately following the frame. The wireless device can determine an identifier of a second wireless device by comparing the pattern against a set of patterns stored in a signature database, each pattern in the signature database having a corresponding identifier. The wireless device can receive the first RF signal, as described herein, from the second wireless device that sent the series of frames. The device identifier can be used in the reports back to the remote server.

In one embodiment, a wireless device receives a wireless signal from a device that is not part of a wireless network of which the wireless device is part. The wireless device determines a pattern of the wireless signal and stores the pattern as a device signature in a signature database, the signature database includes multiple device signatures each including a different pattern for each device. The wireless device can also report the device signature of the device to the remote server.

In another embodiment, the wireless device receives a radar signal and determines a pattern of the radar signal. The wireless device stores the pattern as a device signature in the signature database. The wireless device can also report the device signature of the radar signal to the remote server. In another embodiment, the wireless device receives a microwave signal from a microwave device. The wireless device determines a pattern of the microwave signal and stores the pattern as a device signature in the signature database. The wireless device can also report the device signature of the microwave device to the remote server.

Figure 11:
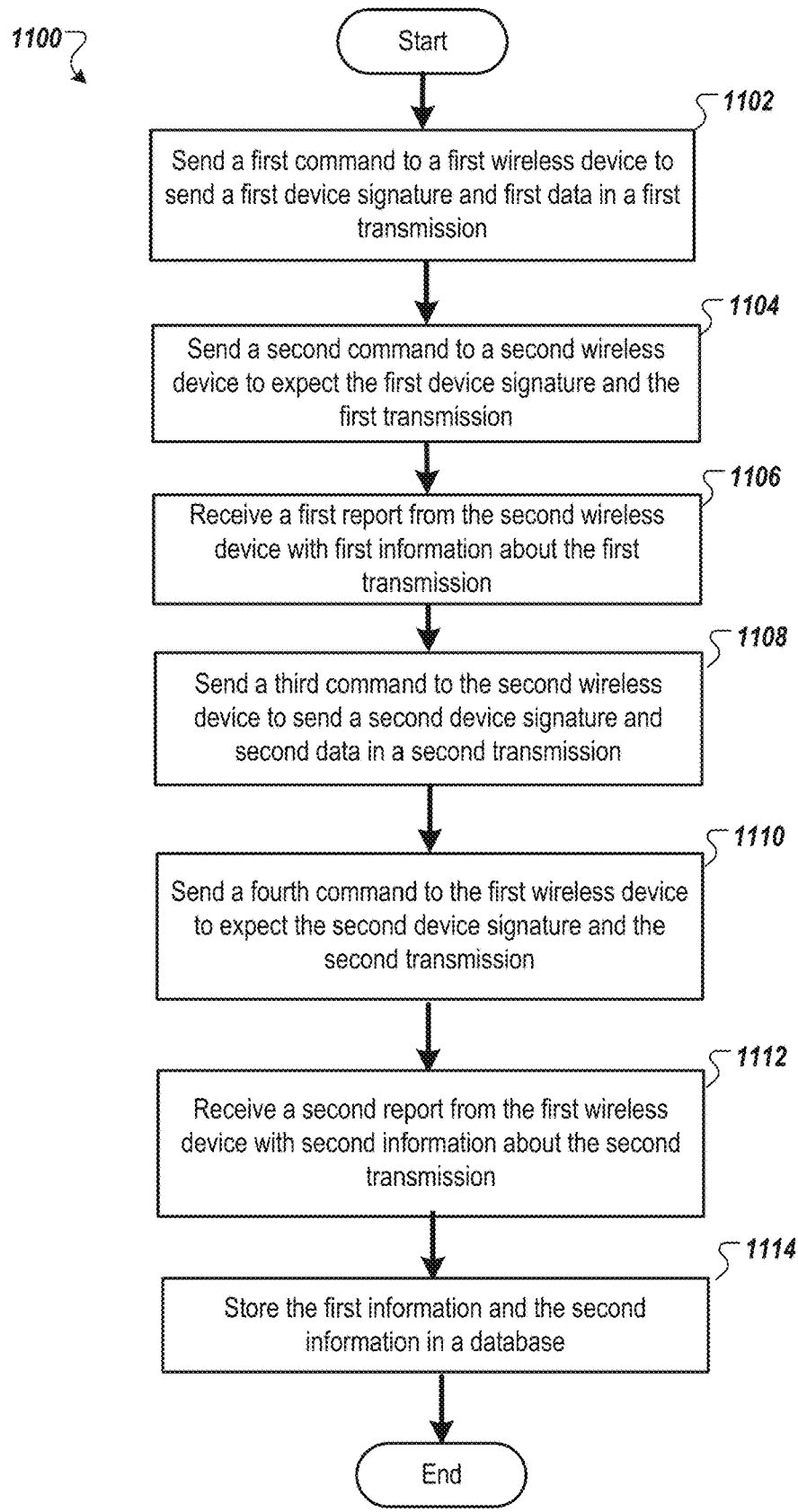
FIG. 11 is a flow diagram of a method of coordinating transmissions to determine congestion levels of one or more channels according to one embodiment.

FIG. 11 is a flow diagram of a method 1100 of coordinating transmissions to determine congestion levels of one or more channels according to one embodiment. The method 1100 may be performed by processing logic that comprises hardware (e.g., circuitry, dedicated logic, programmable logic, microcode, etc.), software, firmware, or a combination thereof. In one embodiment, the method 1100 may be performed by any of the remote servers described herein and illustrated with respect to FIGS. 1-8. The processing logic can be distributed between different remote servers and can be implemented as a web service on a cloud computing system, as described herein.

Referring back to FIG. 11, the method 1100 begins by sending a first command that causes a first wireless device to send i) a first device signature of the first wireless device and ii) first data in a first transmission on a first channel with a first channel bandwidth and between a first start time and a first end time (block 1102). The processing logic sends a second command that causes a second wireless device to monitor for the first device signature and the first transmission on the first channel with the first channel bandwidth and between the first start time and the first end time (block 1104). The processing logic receives a first report from the second wireless device, the first report including first information identifying a first device type, a first device identifier, the first device signature, a first signal strength of the first transmission, the first channel, the first channel bandwidth, the first start time, and the first end time (block 1106). The processing logic sends a third command that causes the second wireless device to send iii) a second device signature of the second wireless device and iv) second data in a second transmission on a second channel with a second channel bandwidth and between a second start time and a second end time (block 1108). The processing logic sends a fourth command that causes the first wireless device to monitor for the second device signature and the second transmission on the second channel with the second channel bandwidth and between the second start time and the second end time (block 1110). The processing logic receives a second report from the first wireless device, the second report comprising second information identifying a second device type, a second device identifier, the second device signature, a second signal strength of the second transmission, the second channel, the second channel bandwidth, the second start time, and the second end time (block 1112). The processing logic stores the first information and the second information in a database (block 1114), and the method 1100 ends.

In a further embodiment, the processing logic can determine a congestion level using the first information and the second information. The processing logic can determine a congestion level of a channel, of a frequency band, or any frequency range.

In a further embodiment, the processing logic receives a third report from the first wireless device. The third report can include third information identifying a third device type of an interference source, a third device identifier of the interference source, a third device signature of the interference source, a third signal strength of electromagnetic energy received from the interference source, a third channel identifier of a channel affected by the electromagnetic energy received from the interference source, a third bandwidth identifier of a channel bandwidth of the electromagnetic energy, a third start time of the electromagnetic energy received from the interference source, and a third end time of the electromagnetic energy received from the interference source. The processing logic can store the third information in the database. The interference source can be a device that is not part of a wireless network, including the first wireless device and the second wireless device.

In another embodiment, the processing logic sends a copy of the database to each device in a wireless network, including the first wireless device and the second wireless device. Although the embodiments described above discuss a first wireless device, a second wireless device, an interference source that is not part of the wireless network, in other embodiments, the processing logic can send additional commands to more devices that are part of the wireless network and receive reports with information about devices that are part of the network and devices that are not part of the wireless network.

Figure 12:
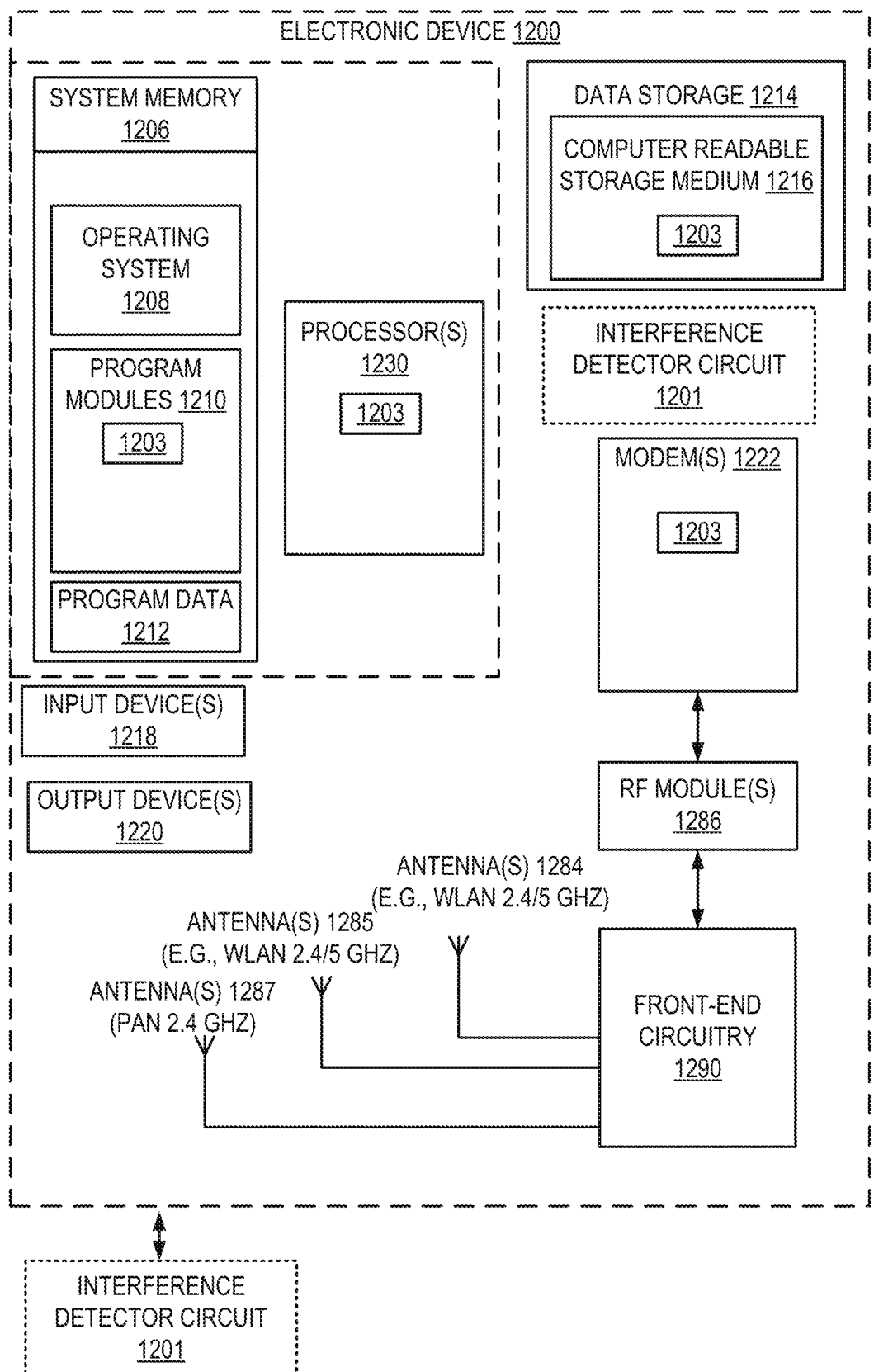
FIG. 12 is a block diagram of an electronic device that can be configured to detect interference sources as described herein according to one embodiment.

FIG. 12 is a block diagram of an electronic device 1200 that can be configured to detect interference sources as described herein according to one embodiment. The electronic device 1200 may correspond to the electronic devices described above with respect to FIGS. 1-11. In one embodiment, the electronic device 1200 is the wireless devices described herein and includes an interference detector circuit 1201. Alternatively, the electronic device 1200 is coupled to the interference detector circuit 1201. In one embodiment, the interference detector circuit 1201 is the interference detector circuit 102 of FIG. 1. In another embodiment, the interference detector circuit 1201 is the interference detector circuit 202 of FIG. 2. Alternatively, the interference detector circuit 1201 is the RF-DC detector 706 of FIG. 7. In another embodiment, the electronic device 1200 is the remote server described herein. For example, the interference detector circuit 1201 can be any device that communicates the energy tones or the device signatures to the remote server. Alternatively, the electronic device 1200 may be other electronic devices, as described herein.

The electronic device 1200 includes one or more processor(s) 1230, such as one or more CPUs, microcontrollers, field programmable gate arrays, or other types of processors. The electronic device 1200 also includes system memory 1206, which may correspond to any combination of volatile and/or non-volatile storage mechanisms. The system memory 1206 stores information that provides operating system component 1208, various program modules 1210, program data 1212, and/or other components. In one embodiment, the system memory 1206 stores instructions of methods to control operation of the electronic device 1200. The electronic device 1200 performs functions by using the processor(s) 1230 to execute instructions provided by the system memory 1206. In one embodiment, the program modules 1210 may include processing logic 1203 that may perform some or all of the operations described herein, such as the method 900, the method 1000, the method 1100, or any combination thereof. The processing logic 1203 may perform some or all of the operations descried herein.

The electronic device 1200 also includes a data storage device 1214 that may be composed of one or more types of removable storage and/or one or more types of non-removable storage. The data storage device 1214 includes a computer-readable storage medium 1216 on which is stored one or more sets of instructions embodying any of the methodologies or functions described herein. Instructions for the program modules 1210 (e.g., processing logic 1203) may reside, completely or at least partially, within the computer-readable storage medium 1216, system memory 1206 and/or within the processor(s) 1230 during execution thereof by the electronic device 1200, the system memory 1206 and the processor(s) 1230 also constituting computer-readable media. The electronic device 1200 may also include one or more input devices 1218 (keyboard, mouse device, specialized selection keys, etc.) and one or more output devices 1220 (displays, printers, audio output mechanisms, etc.).

The electronic device 1200 further includes a modem 1222 to allow the electronic device 1200 to communicate via a wireless connections (e.g., such as provided by the wireless communication system) with other computing devices, such as remote computers, an item providing system, and so forth. The modem 1222 can be connected to one or more radio frequency (RF) modules 1286. The RF modules 1286 may be a WLAN module, a WAN module, wireless personal area network (WPAN) module, Global Positioning System (GPS) module, or the like. The antenna structures (antenna(s) 1284, 1285, 1287) are coupled to the front-end circuitry 1290, which is coupled to the modem 1022. The front-end circuitry 1290 may include radio front-end circuitry, antenna switching circuitry, impedance matching circuitry, or the like. The antennas 1284 may be GPS antennas, Near-Field Communication (NFC) antennas, other WAN antennas, WLAN or PAN antennas, or the like. The modem 1222 allows the electronic device 1200 to handle both voice and non-voice communications (such as communications for text messages, multimedia messages, media downloads, web browsing, etc.) with a wireless communication system. The modem 1222 may provide network connectivity using any type of mobile network technology including, for example, Cellular Digital Packet Data (CDPD), General Packet Radio Service (GPRS), EDGE, Universal Mobile Telecommunications System (UMTS), Single-Carrier Radio Transmission Technology (1×RTT), Evaluation Data Optimized (EVDO), High-Speed Down-Link Packet Access (HSDPA), Wi-Fi®, Long Term Evolution (LTE) and LTE Advanced (sometimes generally referred to as 4G), etc.

The modem 1222 may generate signals and send these signals to antenna(s) 1284 of a first type (e.g., WLAN 5 GHz), antenna(s) 1285 of a second type (e.g., WLAN 2.4 GHz), and/or antenna(s) 1287 of a third type (e.g., WAN), via front-end circuitry 1290, and RF module(s) 1286 as descried herein. Antennas 1284, 1285, 1287 may be configured to transmit in different frequency bands and/or using different wireless communication protocols. The antennas 1284, 1285, 1287 may be directional, omnidirectional, or non-directional antennas. In addition to sending data, antennas 1284, 1285, 1287 may also receive data, which is sent to appropriate RF modules connected to the antennas. One of the antennas 1284, 1285, 1287 may be any combination of the antenna structures described herein.

In one embodiment, the electronic device 1200 establishes a first connection using a first wireless communication protocol, and a second connection using a different wireless communication protocol. The first wireless connection and second wireless connection may be active concurrently, for example, if an electronic device is receiving a media item from another electronic device via the first connection) and transferring a file to another electronic device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna.

Though a modem 1222 is shown to control transmission and reception via antenna (1284, 1285, 1287), the electronic device 1200 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is used herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, Read-Only Memories (ROMs), compact disc ROMs (CD-ROMs) and magnetic-optical disks, Random Access Memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A wireless device comprising:
an antenna;
a coupler coupled to the antenna;
a wireless local area network (WLAN) radio coupled to the coupler;
a processing device coupled to the WLAN radio; and
an interference detector circuit coupled to the coupler and the processing device, wherein the interference detector circuit comprises:
a first band pass filter (BPF) coupled to the coupler, wherein the first BPF receives a first radio frequency (RF) signal via the antenna and filters out any frequency components of the first RF signal that are outside of a frequency range of a first channel of a WLAN frequency band;
a low-noise amplifier (LNA) coupled to the first BPF, wherein the LNA generates a second RF signal by amplifying the first RF signal while setting an noise floor level for the interference detector circuit;
a power detector coupled to the LNA, wherein the power detector measures a RF power level of the second RF signal and outputs an output voltage signal that is proportional to the RF power level;
an analog-to-digital converter (ADC) coupled to the power detector, the ADC receives the output voltage signal and outputs digital values each representing an amplitude of the output voltage signal; and
a memory storage device coupled to the processing device, the memory storage device stores a lookup table, the lookup table maps an amplitude value to an energy value, wherein:
the processing device receives the digital values from the ADC;
the processing device determines an energy value for each of the digital values using the lookup table; and
determines a congestion energy level of the first channel using a percentage of time the energy values exceed a threshold within a specified time period.

2. The wireless device of claim 1, wherein the interference detector circuit further comprises:
a low pass filter (LPF) coupled to the LNA, wherein the LPF generates an intermediate RF signal by filtering the second RF signal above a specified cutoff frequency to remove additional noise and outputting the intermediate RF signal as the second RF signal to the power detector;
a local oscillator (LO) coupled to the processing device; and
a mixer coupled to the LO and the LNA, the mixer down converts a first frequency of the second RF signal to a second frequency that is lower than the first frequency, wherein the interference detector circuit, using the mixer, the LNA, and the power detector, demodulates the first RF signal and outputs the output voltage signal.

3. The wireless device of claim 1, wherein the interference detector circuit further comprises:
a second BPF coupled in parallel with the first BPF between the coupler and the LNA; and
switching circuitry coupled to the first BPF, the second BPF, and the processing device, wherein the processing device selectively couples one of the first BPF or the second BPF between the coupler and the LNA using the switching circuitry, wherein the second BPF filters out any frequency components of the first RF signal that are outside of a second frequency range corresponding to a second channel of the WLAN frequency band, wherein the second frequency range and the frequency range are different.

4. A method comprising:
receiving, by a wireless device, a first radio frequency (RF) signal;
determining, by the wireless device, a RF power level of the first RF signal;
converting, by the wireless device, the RF power level to a plurality of samples, wherein each of the plurality of samples comprises a digital value that represents a scaled voltage level corresponding to an amount of power in the first RF signal at a discrete time;
determining, by the wireless device, an energy value for each of the plurality of samples using a voltage-to-energy lookup table; and
determining, by the wireless device, a congestion level of a first channel using the energy values within a time interval.

5. The method of claim 4, wherein determining the RF power level comprises:
generating a second RF signal by amplifying the first RF signal and down-converting a frequency of the first RF signal to an intermediate frequency;
filtering out frequency components of the second RF signal that are above a cutoff frequency;
generating a voltage signal corresponding to the RF power level of the second RF signal; and
sampling the voltage signal at a sampling rate to generate the plurality of samples.

6. The method of claim 5, wherein the sampling rate is in a range of between 1 nanosecond to 20 nanoseconds.

7. The method of claim 4, wherein determining the RF power level comprises:
filtering out frequency components of the first RF signal that are outside of a frequency range of the first channel;
generating a second RF signal by amplifying the first RF signal;
generating a voltage signal corresponding to the RF power level sal of the second RF signal; and
sampling the voltage signal at a sampling rate to generate the plurality of samples.

8. The method of claim 4, further comprising:
receiving, by the wireless device, a second RF signal;
determining, by the wireless device, a second RF power level of the second RF signal;
converting, by the wireless device, the second RF power level to a second plurality of samples, wherein each of the second plurality of samples comprises a second digital value that represents a second scaled voltage level corresponding to a second amount of power in the second RF signal at a discrete time;
determining, by the wireless device, a second energy value for each of the second plurality of samples using the voltage-to-energy lookup table; and
determining, by the wireless device, a second congestion level of a second channel using the second energy values within a second time interval.

9. The method of claim 8, further comprising:
filtering out any frequency components of the RF signals that are outside of a second frequency range of the second channel;
generating a third RF signal by amplifying the second RF signal;
generating a second voltage signal corresponding to the second RF power level signal of the third RF signal; and
sampling the second voltage signal at a sampling rate to generate the second plurality of samples.

10. The method of claim 8, wherein determining the RF power level comprises:
generating a third RF signal by amplifying the second RF signal and down-converting a frequency of the second RF signal to an intermediate frequency;
filtering out frequency components of the third RF signal that are above a cutoff frequency;
generating a second voltage signal corresponding to the second RF power level of the second RF signal; and
sampling the second voltage signal at a sampling rate to generate the second plurality of samples.

11. The method of claim 4, further comprising:
receiving, by the wireless device, a series of frames;
determining, by the wireless device, a pattern in which the series of frames is received, wherein the pattern includes, for each frame in the series of frames, a first amount of time for which the frame is received and a second amount of time that spans the end of receipt of the frame and beginning of receipt of another frame immediately following the frame; and
determining, by the wireless device, an identifier of a second wireless device by comparing the pattern against a set of patterns stored in a signature database, each pattern in the signature database having a corresponding identifier, wherein the wireless device receives the first RF signal from the second wireless device.

12. The method of claim 4, further comprising:
receiving, by the wireless device, a series of frames;
determining, by the wireless device, a pattern in which the series of frames is received, wherein the pattern includes, for each frame in the series of frames, a first amount of time for which the frame is received and a second amount of time that spans the end of receipt of the frame and beginning of receipt of another frame immediately following the frame;
comparing the pattern against a plurality of device signatures stored in a signature database, each of the plurality of device signatures comprising a different pattern and corresponding to each wireless device that is part of a wireless network; and
matching the pattern to a first device signature of the plurality of device signatures, wherein the first device signature is associated with an device identifier of a second wireless device, the second wireless device transmitting the first RF signal.

13. The method of claim 4, further comprising:
receiving, by the wireless device, a radar signal;
determining, by the wireless device, a pattern of the radar signal; and storing, by the wireless device, the pattern as a device signature in a signature database, the signature database comprising a plurality of device signatures, each comprising a different pattern for each wireless device that is part of a wireless network.

14. The method of claim 4, further comprising:
receiving, by the wireless device, a wireless signal from a device that is not part of a wireless network of which the wireless device is part;
determining, by the wireless device, a pattern of the wireless signal; and
storing, by the wireless device, the pattern as a device signature in a signature database, the signature database comprises a plurality of device signatures, each comprising a different pattern for each device.

15. The method of claim 4, further comprising:
receiving, by the wireless device, a microwave signal from a microwave device;
determining, by the wireless device, a pattern of the microwave signal; and
storing, by the wireless device, the pattern as a device signature in a signature database, the signature database comprises a plurality of device signatures, each comprising a different pattern for each device.

16. The method of claim 4, further comprising:
receiving, by the wireless device, a first report from a second device, the first report comprising a first device type, a first device identifier, a first device signature, a first channel identifier, a first channel bandwidth, first transmission start and end times of a first transmission received by the second device;
receiving, by the wireless device, a second report from a third device, the second report comprising a second device type, a second device identifier, a second device signature, a second channel identifier, a second channel bandwidth, second transmission start and end times of a first second received by the third device;
aggregating, by the wireless device, the first report and the second report into a third report; and
sending, by the wireless device, the third report to a remote server.

17. The method of claim 4, further comprising:
receiving a signature database from a remote server, the signature database comprising a plurality of device signatures, each of the plurality of device signatures corresponding to each wireless device in a wireless network;
storing the signature database in memory of the wireless device; and
receiving a message from the remote server, the message comprising a command to monitor for an incoming transmission from a second wireless device in the wireless network, wherein the message further comprises a device identifier of the second wireless device in the wireless network, a device type of the second wireless device, a device signature of the second wireless device, a channel identifier for the incoming transmission, a channel bandwidth identifier for the incoming transmission, a transmission start time for the incoming transmission, and a transmission end time for the incoming transmission, and wherein receiving the first RF signal comprises receiving the first RF signal after the transmission start time.

18. The method of claim 4, further comprising:
receiving a message from a remote server, the message comprising a command that causes the wireless device to send a device signature of the wireless device and data using a specified channel, at a specified channel bandwidth, at a transmission start time, and finishing at a transmission end time; and
sending, by the wireless device, a series of frames in a pattern of the device signature and the data on the specified channel, at the specified channel bandwidth, between the transmission start time and the transmission end time.

19. A wireless device comprising:
a radio configured to receive a first radio frequency (RF) signal;
a memory device that stores a voltage-to-energy lookup table;
a processing device coupled to the radio; and
an interference detector circuit coupled to the processing device and the radio, wherein the interference detector circuit is configured to:
determine a RF power level of the first RF signal;
convert the RF power level to a plurality of samples, wherein each of the plurality of samples comprises a digital value that represents a scaled voltage level corresponding to an amount of power in the first RF signal at a discrete time, wherein the processing device is configured to:
determine an energy value for each of the plurality of samples using the voltage-to-energy lookup table; and
determine a congestion level of a first channel using the energy values within a time interval.

20. The wireless device of claim 19, wherein the interference detector circuit, to determine the RF power level, is configured to:
filter out frequency components of the first RF signal that are outside of a frequency range of the first channel;
generate a second RF signal by amplifying the first RF signal;
generate a voltage signal corresponding to the RF power level of the second RF signal; and
sample the voltage signal at a sampling rate to generate the plurality of samples.

* * * * *